(12) United States Patent
Yuzurihara et al.

(10) Patent No.: US 11,336,179 B2
(45) Date of Patent: May 17, 2022

(54) DC/DC CONVERTER, AND CONTROL METHOD FOR DC/DC CONVERTER

(71) Applicant: KYOSAN ELECTRIC MFG. CO., LTD., Yokohama (JP)

(72) Inventors: Itsuo Yuzurihara, Yokohama (JP); Yu Hosoyamada, Yokohama (JP)

(73) Assignee: KYOSAN ELECTRIC MFG. CO., LTD., Yokohama (JP)

( * ) Notice: Subject to any disclaimer, the term of this patent is extended or adjusted under 35 U.S.C. 154(b) by 71 days.

(21) Appl. No.: 17/049,098

(22) PCT Filed: Apr. 24, 2018

(86) PCT No.: PCT/JP2018/016538
§ 371 (c)(1),
(2) Date: Oct. 20, 2020

(87) PCT Pub. No.: WO2019/202746
PCT Pub. Date: Oct. 24, 2019

(65) Prior Publication Data
US 2021/0242775 A1 Aug. 5, 2021

(30) Foreign Application Priority Data

Apr. 20, 2018 (JP) .............................. JP2018-081793

(51) Int. Cl.
*H02M 3/158* (2006.01)
*H02M 1/00* (2006.01)
(52) U.S. Cl.
CPC ......... *H02M 3/158* (2013.01); *H02M 1/0003* (2021.05)
(58) Field of Classification Search
CPC ............. H02M 1/0003; H02M 1/0006; H02M 1/0025; H02M 1/0032; H02M 1/08;
(Continued)

(56) References Cited

U.S. PATENT DOCUMENTS

| 6,693,808 B2 | 2/2004 | Myono |
| 9,246,390 B2 * | 1/2016 | Lopata ................ H02M 3/1588 |

(Continued)

FOREIGN PATENT DOCUMENTS

| JP | 7-78034 A | 3/1995 |
| JP | 11-18469 A | 1/1999 |

(Continued)

OTHER PUBLICATIONS

Office Action dated Jun. 30, 2021, issued in counterpart IN Application No. 202037045196 with English translation. (7 pages).

(Continued)

*Primary Examiner* — Matthew V Nguyen
(74) *Attorney, Agent, or Firm* — WHDA, LLP

(57) ABSTRACT

In a discrete constant voltage control which carries out a voltage switch between different voltage levels, the present invention suppresses the influence of low-speed output detection voltage, carries out a high-speed transition under stable voltage conditions, and carries out a stabilized control in a constant voltage condition. The DC/DC converter of the present invention, in a discrete constant voltage control for voltage switching which switches different voltage levels and outputs the same, (i) by means of setting a gain A (A1, A2), suppresses the influence of an output voltage detection from following a command voltage and removing the detection output voltage Vo term, and (ii) by means of using an output voltage Vodet, which was estimated from a capacitor current, instead of the low-speed detection output voltage, suppresses the influence of the low-speed detection output voltage and suppresses the influence of a control from a delay time.

10 Claims, 20 Drawing Sheets

(58) Field of Classification Search
CPC ...... H02M 3/155; H02M 3/156; H02M 3/158; H02M 3/1586
See application file for complete search history.

(56) References Cited

U.S. PATENT DOCUMENTS

| | | | |
|---|---|---|---|
| 2011/0101938 A1 | 5/2011 | Ma et al. | |
| 2012/0215216 A1 | 8/2012 | Friedrichs et al. | |
| 2015/0238248 A1 | 8/2015 | Thompson et al. | |
| 2016/0006272 A1 | 1/2016 | Greening | |
| 2016/0302847 A1 | 10/2016 | Erickson et al. | |
| 2017/0288417 A1 | 10/2017 | Trichy | |
| 2017/0310211 A1* | 10/2017 | Hong | H02M 1/08 |
| 2019/0157974 A1* | 5/2019 | Tomita | H02M 1/08 |

FOREIGN PATENT DOCUMENTS

| | | | |
|---|---|---|---|
| JP | 2003-111386 A | 4/2003 | |
| JP | 2011-504356 A | 2/2011 | |
| JP | 2016-185389 A | 10/2016 | |
| JP | 2017-12784 A | 1/2017 | |
| WO | WO-2014200049 A1 * | 12/2014 | ............ B60L 11/005 |
| WO | 2017/173182 A1 | 10/2017 | |

OTHER PUBLICATIONS

International Search Report dated Jul. 3, 2018, issued in counterpart International Application No. PCT/JP2018/016538 (2 pages).

Mizushima et al., "DC Converter Control Using Deadbeat Control of High Switching Frequency for Two-type Operation Modes", Proceeding of the 40th Annual Conference of the IEEE Industrial Electronics Society (IECON 2014), IEEE, Oct. 29, 2014, vol. 1, pp. 5029-5034, (6 pages).

Kawamura et al., "Deadbeat Controlled PWM Inverter with Parameter Estimation Using Only Voltage Sensor", IEEE transactions on Power Electronics, Apr. 1988, vol. 3, No. 2, pp. 118-125, (9 pages).

Li et al., "A Delay-compensated Deadbeat Current Controller for AC Electronic Load", Proceeding of the 25th Chinese Control Conference, 2006, pp. 1981-1985, (5 pages).

Hung et al., "Analysis and implementation of a delay-compensated deadbeat current controller for solar inverters", IEE Proceeding of Circuits, Devices and Systems, Oct. 2001, vol. 148, No. 5, pp. 279-286, (8 pages).

Nussbaumer et al., "Comparison of Prediction Techniques to Compensate Time Delays Caused by Digital Control of a Three-Phase Buck-Type PWM Rectifier System", IEEE Transactions on Industrial Electronics, Feb. 2008, vol. 55, No. 2, pp. 791-799, (9 pages).

Chen et al., "Predictive Digital Current Programmed Control", IEEE Transactions on Power Electronics, Jan. 2003, vol. 18, No. 1, pp. 411-419, (9 pages).

Mizushima et al., "High/Low Pulse Generation of Deadbeat Based High Power DC-DC converter with Very Short Rise Time", IEEE 8th International Power Electronics and Motion Control Conference (IPEMC-ECCE Asia), 2016, vol. 1, (7 pages).

Extended (Supplementary)European Search Report dated Dec. 15, 2021, issued in counterpart EP Application No. 18915719.1. (12 pages).

Cheung, Victor Sui-pung et al., "Capacitor current programming technique for phase-shift DC-DC converter", Energy Conversion Congress and Exposition (ECCE), 2011 IEEE, IEEE, Sep. 17, 2011 (Sep. 17, 2011), pp. 1251-1258, XP032067314; (8 pages).

Kapat, Santanu et al., "Formulation of PID Control for DC-DC Converters Based on Capacitor Current: A Geometric Context", IEEE Transactions on Power Electronics, Institute of Electrical and Electronics Engineers, USA, vol. 27, No. 3, Mar. 1, 2012 (Mar. 1, 2012), pp. 1424-1432, XP011406706; (9 pages).

Adachi, Yuto et al., "Design of approximate 2DOF digital controller for interleaved PFC boost converter", 2014 International Electrical Engineering Congress (IEECON), IEEE, Mar. 19, 2014 (Mar. 19, 2014), pp. 1-4, XP032661730; (4 pages).

Vargas, Gil G. M. et al., "Digital controller design for interleaved boost converter in photovoltaic system", 2016 12th IEEE International Conference on Industry Applications (INDUSCON), IEEE, Nov. 20, 2016 (Nov. 20, 2016), pp. 1-8, XP033074104; (8 pages).

Beccuti, A.G. et al., "A Decentralized Explicit Predictive Control Paradigm for Parallelized DC-DC Circuits", IEEE Transactions on Control Systems Technology, IEEE Service Center, New York, NY, US, vol. 21, No. 1, Jan. 1, 2013 (Jan. 1, 2013), pp. 136-148, XP011482705; (13 pages).

Balen, Gleisson et al., "Modeling and control of interleaved buck converter for electric vehicle fast chargers", 2017 Brazilian Power Electronics Conference (COBEP), IEEE, Nov. 19, 2017 (Nov. 19, 2017), pp. 1-6, XP033297156; (6 pages).

* cited by examiner (a) Current Source LCR Circuit (b) Voltage Source LCR Circuit

DC/DC CONVERTER, AND CONTROL METHOD FOR DC/DC CONVERTER

TECHNICAL FIELD

The present invention relates to a DC/DC converter for switching a voltage level of a DC voltage, and a control method for the DC/DC converter.

BACKGROUND ART (High/Low Pulse Operation)

In recent years, for example, high-frequency power (RF output) has been used in the field of plasma application, which power is generated by an ON/OFF pulse operation for turning ON/OFF in a cycle of several tens of Hz to several tens of kHz or a High/Low pulse operation for varying an amplitude of RF power at high speed.

These pulse operations are said to be effective for suppressing abnormal discharge occurring due to particles produced during film formation and for microfabrication and others by using low-temperature plasma.

The ON/OFF pulse operation is an operation mode of supplying intermittent high frequency power (RF output) to load. In this operation mode, plasma may be extinguished in an OFF period where the power is not supplied to the load. As a consequence, once the plasma is extinguished, the RF output will have a mismatch with a plasma impedance.

By contrast, the High/Low pulse operation is an operation mode of periodically varying continuous high frequency power, which does not intermit at all times, to the load by dividing different two levels of a high level and a low level, thereby supplying power at a level different from the high level, instead of utilizing the OFF period of the ON/OFF pulse operation. For example, in the power supplying to the plasma, a continuous output is produced between power on a high side that is necessary to form a thin film and power on a low side that is necessary to maintain plasma discharge to thereby prevent the plasma from being extinguished and maintain constant stable plasma discharge.

(DC/DC Converter)

There is a method for performing the High/Low pulse operation to control a DC/DC converter section in an RF generator.

Since it is required to make a fast transition between two different voltage levels to control the DC/DC converter section, a frequency limitation of the High/Low pulse operation is dependent on control responsivity of the DC/DC converter. Thus, in order to make the fast transition between the voltage levels, it is necessary to change the voltage quickly in the DC/DC converter and control the voltage stably.

As a control method of the DC/DC converter, a PI control is well known. The PI control is a classic way of conducting the control in which a difference between a command value and a detection value is proportioned and integrated to calculate a manipulated variable.

As an example, there is a PI control adopting a double closed loop control system comprising a minor loop using a capacitance current and a major loop using a detected output voltage. The PI control of the closed loop control type is classical, and the control responses of the major loop and the minor loop have the following limitations.

1) Since the minor loop is affected by, such as, dead time, the maximum control response thereof is a frequency of about $1/10$ of a switching frequency.

2) Due to the prevention of interference with the minor loop, the maximum control response of the major loop is a frequency of about $1/10$ of the control response of the minor loop.

Thus, the maximum control response of the major loop is a frequency of about $1/100$ of the switching frequency. Due to this limitation in the control response, when the High/Low pulse operation is conducted at a frequency of 10 kHz or more, the switching frequency will exceed 1 MHz to thereby cause control complication, and the control response of the closed loop control will exceed the limitation. Accordingly, it is difficult in the PI control to achieve a stable High/Low pulse operation that can gain fast rise time and fall time.

(Discrete Control)

As a control method for a DC/DC converter with high responsivity, there is a discrete control. FIG. 20 shows a diagram of PI control and discrete control. PI control illustrated in FIG. 20(a) calculates a manipulated variable by detecting an error between an output and a command value, so as to gradually follow the command value according to a control response frequency.

By contrast, the discrete control shown in FIG. 20(b) uses a model of a main circuit of the DC/DC converter and a detection value to calculate a manipulated variable required for matching a control value with a desired value after one sample. The manipulated variable is then fed to the main circuit to carry out non-linear control for matching a command value with the control value at a next sample point.

The discrete control computes a pulse width $\Delta T(k)$ for each sampling period so that a control value of the (ks+1)-th sampling period becomes equal to the desired value for a state equation obtained by expanding a circuit state with an input and an output as state variables by a discrete model, and the output is then controlled by a switching operation according to the obtained pulse width $\Delta T(k)$.

In the discrete control, a switching frequency remains the maximum control response in an ideal state. In this case, the manipulated variable of the discrete control is determined by using a relational expression of the modeled main circuit.

Non-Patent Literature 1 suggests control using a voltage detection value only. In addition, Non-Patent Literatures 2 to 4 teach control of estimation of a delay to implement compensation. Moreover, Non-Patent Literature 5 refers to an influence on the stability by a delay time caused by averaging in digital control.

With respect to the control by the High/Low pulse operation, ILrefcontrol using an inductance current iL as detection value has been suggested (Non-Patent Literature 6). The ILref control is output control performed by using the inductance current as desired value and considering an output current Iout as disturbance. Non-Patent Literature 7 teaches that a transition by 108V from Low 12V to High 120V is achieved in 518 μs at a switching frequency of 200 kHz.

CITATION LIST

Non-Patent Literature

Non-Patent Literature 1: A. Kawamura, T. Haneyoshi, and R. G. Hoft, "Deadbeat Controlled PWM Inverter with Parameter Estimation Using Only Voltage Sensor", IEEE transactions on Power Electronics, Vol. 3, Issue 2, pp. 118-125 (1988)

Non-Patent Literature 2: C. Li, S. Shen, M. Guan, J. Lu, and J. Zhang, "A Delay-compensated Deadbeat Current Controller for AC Electronic Load", In Proceeding of the 25th Chinese Control Conference, CCC 2006, pp. 1981-1985 (2006)

Non-Patent Literature 3: K. Hung, C. Chang, and L. Chen, "Analysis and Implementation of a Delay-compensated Deadbeat Current Controller for Solar Inverters", In Proceeding of Circuits, Devices and Systems, Vol. 148, pp. 279-286 (2001)

Non-Patent Literature 4: T. Nussbaumer, M. L. Heldwein, G. Gong, S. D. Round, and J. W. Kolar, "Comparison of Prediction Techniques to Compensate Time Delays Caused by Digital Control of a Three-Phase Buck-Type PWM Rectifier System", IEEE Transactions on Industrial Electronics, Vol. 55, Issue 2, pp. 791-799 (2008)

Non-Patent Literature 5: J. Chen, A. Prodic, R. W. Erickson, and D. Maksimovic, "Predictive Digital Current Programmed Control", IEEE Transactions on Power Electronics, Vol. 18, Issue 1, pp. 411-419 (2003)

Non-Patent Literature 6: S. Mizushima, A. Kawamura, I. Yuzurihara, A. Takayanagi, and R. Ohma, "DC Converter Control Using Deadbeat Control of High Switching Frequency for Two-type Operation Modes", In Proceeding of the 40th Annual Conference of the IEEE, IECON 2014, Vol. 1, pp. 5029-5034 (2014)

Non-Patent Literature 7: S. Mizushima, H. Adachi, A. Kawamura, I. Yuzurihara, and R. Ohma, "High/Low Pulse Generation of Deadbeat Based High Power DC-DC converter with Very Short Rise Time", In Proceeding of the 8th International Power Electronics and Motion Control Conference of the IEEE, IPEMC-ECCE Asia 2016, Vol. 1, pp. 609-615 (2016)

SUMMARY OF INVENTION

Problems to be Solved by the Invention

In the High/Low pulse operation of the DC/DC converter, if a transition time taken for rising during the transition from the low side power to the high side power and a transition time taken for falling during the transition from the high side power to the low side power are slow, unstable plasma is generated in a transition period that leads to the formation of an uneven thin film. Thus, it is required to enhance the speed of rising and falling to shorten the transition times.

When the switching frequency is increased to achieve high-speed response, a delay time developed between a main circuit and a control unit has a measurable influence on the acquisition of voltage and current detection values. The delay time is an acquisition delay in a detector, a computation delay developed when computing manipulated variables for discrete control or others and a response delay in a switching device of a DC/DC converter, by way of example.

when a detected output voltage vo is detected by low-speed detected output voltage to use the detected output voltage thus obtained for the constant-voltage discrete control carried out for the voltage switching between different voltage levels, e.g. on High/Low pulse operation, the detected output voltage vo is significantly affected by a delay time developed in the detection of the output voltage. Thus, when the voltage switching between the different voltage levels is conducted by the constant-voltage discrete control, it is necessary to suppress the influence of the low-speed detected output voltage to thereby suppress the influence of the control due to the delay time, to perform stable transition between high-speed voltages, and to perform stable control in a constant-voltage state.

The present invention aims to solve the existing problem, and to suppress the influence of the low-speed detected output voltage to thereby suppress the influence of the control due to the delay time, to perform stable transition between high-speed voltages, and to perform stable control in a constant-voltage state in the constant-voltage discrete control for the voltage switching between the different voltage levels.

Means for Solving the Problem

The present invention (i) sets gains A (A1, A2) and (ii) employs an output voltage vodet in the constant-voltage discrete control for the voltage switching in which a voltage is varied between the different levels so as to be output, thereby suppressing the influence of the low-speed detected output voltage and thus suppressing the influence of the control due to the delay time.

The discrete control of the present invention is for determining a pulse width $\Delta T$ that allows to obtain an output according to a command value at a point after n-sample from the present time, wherein n can be an arbitrary integer. Thus, if n is set to "1", the control is carried out at a point after one sample.

(i) The present invention deletes the term of the detected output voltage vo to suppress the influence of the detected output voltage. The term of the detected output voltage vo is deleted by setting the gain A(A2) of the output voltage with respect to a command value in an input-output relation in a main circuit according to a cycle of the discrete control. The term of the detected output voltage vo is deleted in a retention period in which the voltage is retained by the constant-voltage discrete control so as to define only a capacitance current ic, which can be detected in high-speed, as a detection value, thereby suppressing the influence of the low-speed detected output voltage.

As the speed of the control of the voltage level switching increases, an overshoot and undershoot occur notably during the formation of the output. The present invention uses the gains A1 (AH1, AL1) as coefficients for defining a property of following a command voltage in a buffering drive circuit between a transition period, in which the transition of the voltage between a high and low levels is made by the constant-voltage discrete control, and the retention period. The gain AH1 is used as the coefficient for defining the property of following a command voltage VHref on a high power side, while using the gain AL1 as the coefficient for defining the property of following a command voltage VLref on a low power side.

(i) The gains A1 in the buffer period are set to be smaller than the gains A2 in the retention period in the process (i), so that the overshoot and undershoot are prevented.

(ii) In the discrete control, the output voltage vodet estimated based on the capacitance current is used instead of the low-speed detected output voltage to thereby suppress the influence of the delay time.

In accordance with the present invention, a DC/DC converter for converting a DC input into high frequency outputs at two different voltage levels comprises a main circuit including a switching circuit and a control unit, in which the control unit includes the following three modes between a power level before transition and a power level after transition:

a first mode that conducts constant-current control to implement the transition period between the power level before transition and the power level after transition;

a third mode that conducts constant-voltage control to implement the retention period for retaining each voltage at the power level before transition and the power level after transition; and a second mode that conducts the constant-voltage control to implement the buffer period to shift from the transition period to the retention period.

In the first mode and the second mode, the output voltage vodet estimated from the capacitance current is used instead of the detected output voltage in order to suppress the influence of the delay time occurring due to the speed of detecting the output voltage which is slower than the speed of detecting the capacitance current. If it is possible to detect the output voltage in high-speed in the second mode, the detected output voltage may be used, instead of using the output voltage vodet estimated from the capacitance current.

In the first mode, the second mode and the third mode:

an output voltage to be fed back is an estimated output voltage based on the capacitance current in the first mode and the second mode;

the gain A1 of the main circuit in the second mode is a value that makes a second capacitance current command value to be smaller than a first capacitance current command value; and the gain A2 of the main circuit in the third mode is a value that cancels out a voltage detection value in the third mode.

These three modes are performed in sequence to thereby output high frequencies at a plurality of voltage levels.

The gain A1 is set such that the overshoot and undershoot in the buffer period in the second mode are prevented. The gain A2 is set such that the term of the voltage detection value in the discrete control is compensated in the constant-voltage period in the third mode to eliminate the influence exerted by the low-speed voltage detection.

(Gain A1)

The gain A1 is in the range in which the capacitance current command value in the second mode is smaller than the capacitance current command value in the first mode. In this context, the capacitance current command value in the second mode is an integrated value of a difference between the voltage detection value and the detected voltage value in the second mode and the gain A1.

(Gain AH1)

In the gain A1, the gain AH1 on the high power side is within the following range, where VHref is the voltage command value on the high power side.

(Formula 1)

$$0 < A_{H1} < \frac{I_{Cref}}{(V_{Href} - V_{odet\_mode2})}$$

(Formula 2)

$$0 < A_{L1} < \frac{I_{Cref}}{(-V_{Lref} + V_{odet\_mode2})}$$

(Gain A2)

In the main circuit of the DC/DC converter comprising an n-phase LC circuit composed of a series-parallel circuit formed by an inductance L and a capacitance C in each phase which are connected in series-parallel, provided that Ts is a control cycle of the control unit, Td is a delay time from the control unit to the main circuit, and L is an inductance component in the main circuit, the discrete control of the control unit by n-phase interleaving sets the gain A2 to a value that enables to adjust a coefficient of the detected output voltage in the LC circuit to be zero to delete the term of the detected output voltage, thereby enabling to output the high frequency without being affected by the low-speed detected output voltage.

In the discrete control by the n-phase interleaving, the gain A2 is set to a value of (n(Ts+Td)/L), which is n-times larger than a ratio ((Ts+Td)/L) between the sum of the control cycle Ts and the delay time Td and the inductance component L of the main circuit. For example, in the three-phase interleaving discrete control, if the gain A2 is set to A2=3(Ts+Td)/L so that the term of the detected output voltage vo will be deleted in the expression of the discrete control. By deleting the term of the detected output voltage vo and defining only a capacitance current iC detectable at high speed to a detection value, the influence of the low-speed detected output voltage can be suppressed.

(Control Method for DC/DC Converter)

A control method for a DC/DC converter in which the DC/DC converter comprising a main circuit including a switching circuit and a control unit and converting a DC input into high-frequency outputs at a plurality of different voltage levels, wherein the control unit performs the following three modes between a power level before transition and a power level after transition:

a first mode that conducts constant-current control to implement a transition period for performing the transition between the power level before transition and the power level after transition;

a third mode that conducts constant-voltage control to implement a retention period for retaining voltages at the power level before transition and the power level after transition, and a second mode that conducts the constant-voltage control to implement a buffer period between the transition period and the retention period.

In regard of the first mode, the second mode and the third mode:

the first mode and the second mode use as an output voltage to be fed back an estimated output voltage on the basis of the capacitance current;

the second mode uses as the gain A1 of the main circuit a value that makes a second capacitance current command value to be smaller than a first capacitance current command value; and the third mode uses as the gain A2 of the main circuit a value that cancels out a voltage detection value in the third mode.

These three modes are carried out in sequence to thereby output high frequencies at a plurality of voltage levels.

In the second mode, the estimated output voltage may be replaced by the detected output voltage as output voltage to be fed back.

Effects of the Invention

According to the DC/DC converter of the present invention, the term of the detected output voltage vo is deleted to suppress the influence of the voltage detection. The gain A(A2) of the output voltage with respect to a command value in an input-output relation in a main circuit is set according to a cycle of the discrete control in order to delete the term of the detected output voltage vo, and only a capacitance current ic, which can be detected at high-speed, is defined as a detection value in the retention period for retaining the voltage by the constant-voltage discrete control, thereby suppressing the influence of the low-speed detected output voltage. In addition to that, in the discrete control, the low-speed detected output voltage is replaced by the output voltage vodet estimated from the capacitance current, so as to suppress the influence of the delay time.

BEST MODE FOR CARRYING OUT THE INVENTION

A description will now be made on a DC/DC converter and a control method for the DC/DC converter according to the present invention by referring to the accompanying drawings. In the following description, FIG. 1 is referred to illustrate a schematic configuration example of the DC/DC converter of the present invention, FIGS. 2 to 7 are referred to illustrate discrete control according to the present invention by single-phase, FIGS. 8 to 12 are referred to illustrate the discrete control according to the present invention by multi-phase, and FIGS. 13 to 18 are referred to illustrate each mode in the discrete control according to the present invention.

(Schematic Configuration of the DC/DC Converter of the Present Invention)

Figure 1:
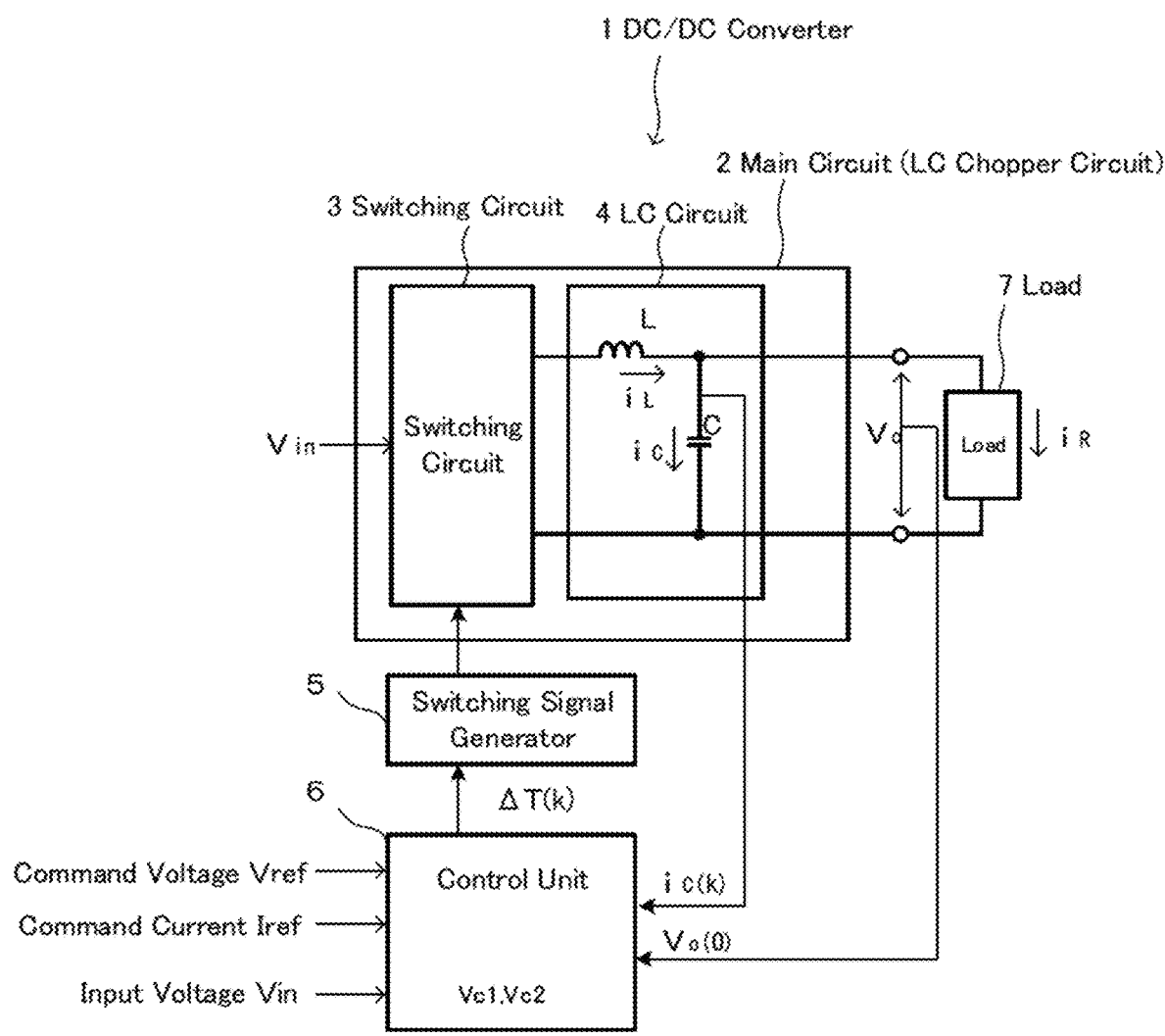
FIG. 1 is a diagram illustrating a schematic configuration example of a DC/DC converter according to the present invention.

With reference to FIG. 1, a schematic configuration of the DC/DC converter of the present invention will be described. A DC/DC converter 1 of the present invention comprises a main circuit (LC chopper circuit) 2 configured to use an input voltage Vin as an input to output a detected output voltage vo and a load current iR, a switching signal generator 5 configured to generate a switching signal for controlling an ON/OFF operation of a switching device of the main circuit 2, and a control unit 6 configured to input detection signals from the main circuit 2 and a load 7 to compute a pulse width $\Delta T(k)$, and then output the computed pulse width $\Delta T(k)$ to the switching signal generator 5.

The LC chopper circuit of the main circuit 2 includes an LC circuit 4 formed by connecting an inductance L and a capacitance C in series-parallel, and a switching circuit 3 configured to conduct multi-phase switching control on the input voltage Vin to thereby supply the LC circuit 4 with an inductance current iL thus produced.

The control unit 6 computes the pulse width $\Delta T(k)$ of the switching signal for controlling the ON/OFF operation of the switching device of the switching circuit 3. The pulse width $\Delta T(k)$ is for determining a time width in an ON state of the switching device in one cycle of switching. The control unit 6 controls power supplied to the load 7 through the LC circuit 4 based on the length of the pulse width $\Delta T(k)$. If the time width of the switching cycle is defined as Ts, the control unit 6 may compute a duty ratio Duty(=$\Delta T(k)/Ts$) of the pulse width $\Delta T(k)$ with respect to the time width T to thereby perform the control based on the duty ratio. The control unit 6 implements the controlling forms of voltage control, current control and power control according to the form of a designated value.

Figure 20:
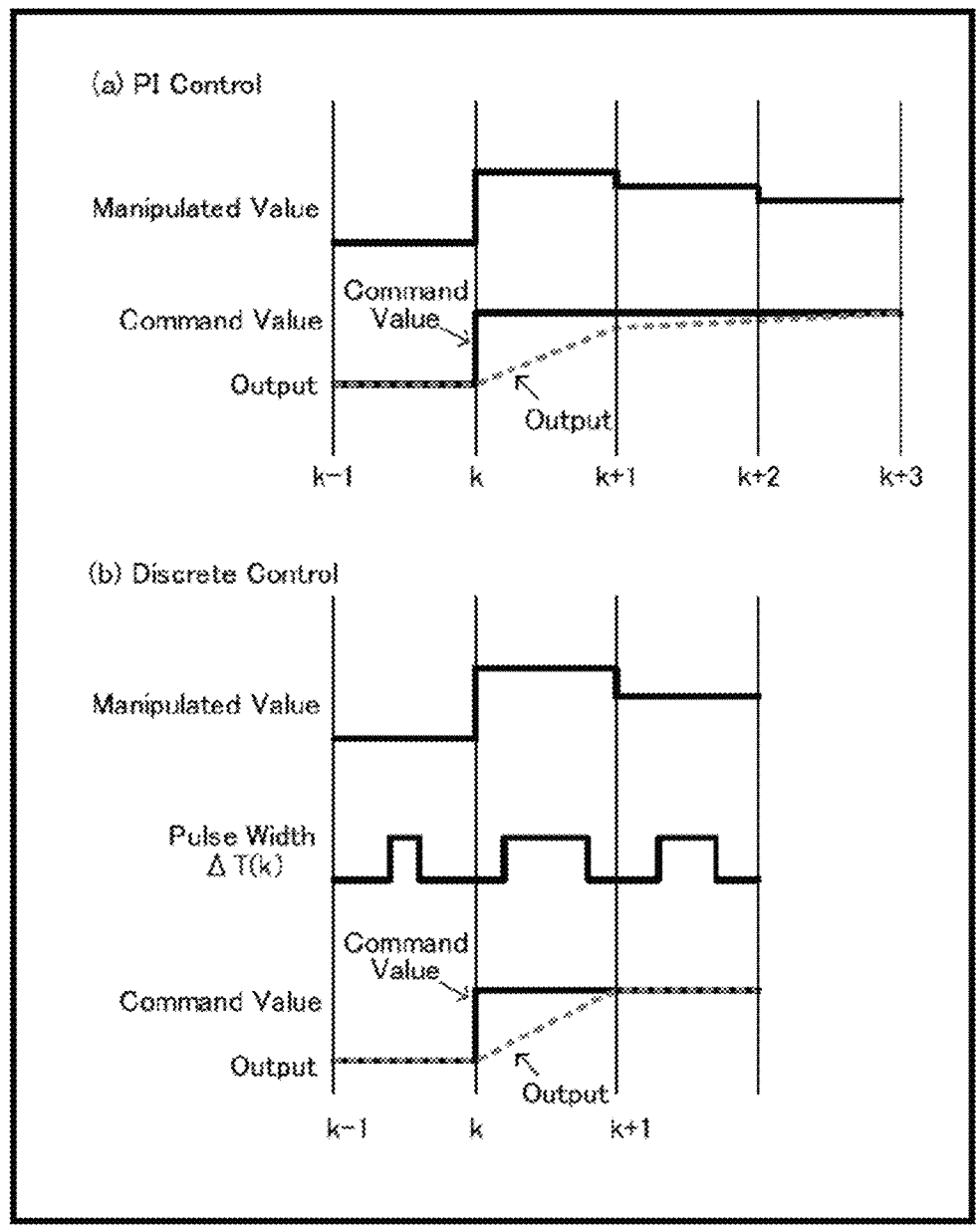
FIG. 20 is a schematic view illustrating PI control and the discrete control.

As shown in FIG. 20(b), the control unit 6 uses an output of (ks+1)-th sampling cycle as a control value to compute the pulse width $\Delta T(k)$ for every sampling cycle such that the control value becomes equal to a command value which is a desired value, and thus conduct discrete control to control the switching operation on the basis of the computed pulse width $\Delta T(k)$. The control unit 6 carries out constant-current control in the discrete control in a predetermined cycle based on a control current including a phase current in the main circuit 2, so as to conduct the computation for every sampling cycle Ts on the pulse width ΔT(k) of the switching signal that actuates a switching device, not illustrated, of the switching circuit 3 of the main circuit 2. In the discrete control by multi-phase interleaving, a combined current obtained by combining a phase current value in each phase is used to produce a control signal. In this context, the sampling cycle is utilized as switching cycle.

The control unit 6 determines the pulse width ΔT(k) computed by carrying out the constant-current control on the control current including the combined current as the pulse width ΔT(k) of each phase current. By carrying out the constant-current control on the control current, a step response becomes a step response for the current, not for a voltage, thereby suppressing a secondary oscillating voltage of an output voltage.

The switching signal generator 5 of the present invention generates a switching signal for each phase with the pulse width ΔT(k) computed by the control unit 6 being set as the pulse width ΔT(k) for each phase. In the computation of the pulse width ΔT(k), the pulse width ΔT(k) is computed based on the control current including the combined current that is obtained by combining the phase current values. In this computation, since the control current is based on the combined current of the phase current values, limitations caused by overlapping between the pulse widths ΔT(k) of the respective phases can be eliminated, thereby enabling to obtain the pulse width ΔT(k) where the pulse widths ΔT of the phases are allowed to overlap one another.

(Discrete Control)

The discrete control of the present invention is for controlling the pulse width ΔT so as to obtain an output according to a command value from the present point to a point after n-th sample. In this context, n may be an arbitrary integer, and if n is "1", the control will be conducted at the point after one sample.

There is control of a feedback gain that is known for setting state variables of currents and voltages after n-th sample. This control is so-called deadbeat control. The discrete control of the present invention is similar to the deadbeat control in terms of performing the control for a predetermined value after the n-th sample. However, instead of obtaining the feedback gain, the discrete control determines the pulse width ΔT that define the power in each control cycle as manipulated variables required for the discrete control.

In the discrete control, in order to derive the manipulated variable required of a controlled variable to follow the command value after one sample, modeling is performed by using a state equation of the main circuit to be controlled. For distinguishing single-phase alternating current and multi-phase alternating current of a commercial AC signal in the control of the DC/DC converter of the present invention, control performed with a series of control signals of a predetermined cycle as single phase is referred to as single-phase control, and control performed with a plurality of series of control signals of the predetermined cycle with their phases shifted from one another is referred to as multi-phase control. The DC/DC converter of the present invention can be applied to the single-phase as well as the multi-phase. Now, the single-phase control will be described first, and then the multi-phase control will be described. In regard of the multi-phase (n-phase) control, the description will be made about three-phase.

<State Equation of Main Circuit>

Figure 2:
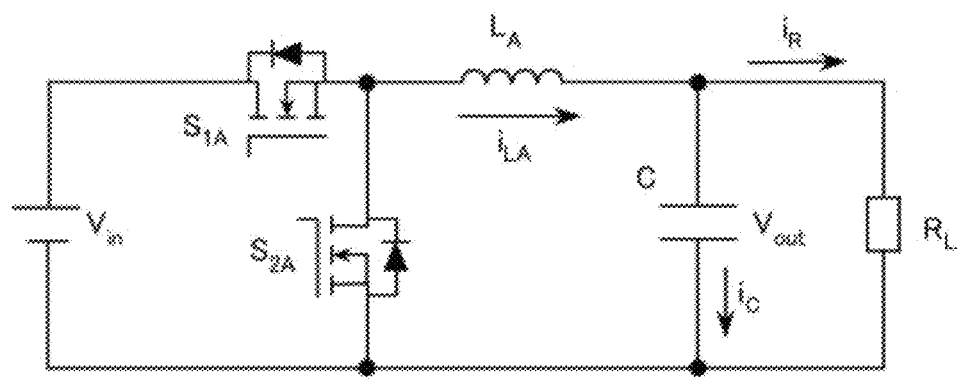
FIG. 2 is a schematic view showing circuitry of a single-phase step-down DC/DC converter in the DC/DC converter according to the present invention.

FIG. 2 illustrates an example of circuitry in a single-phase step-down DC/DC converter. The DC/DC converter comprises a switching circuit including a switching device S1A connected in series and a switching device S2A connected in parallel between an input voltage Vin and a load PL, and an LC circuit including an inductance LA connected in series with respect to the switching circuit and the load and a capacitance C connected in parallel with respect to the switching circuit and the load.

In this DC/DC converter, when input voltages applied across the LC circuit by the switching devices S1A and S2A are defined as u1(t), a circuit equation of the LC circuit can be expressed by the following formula.

(Formula 3)

$$u_1(t) = L_A \frac{di_{LA}}{d_t} + V_o \\ C\frac{dV_o}{dt_o} = i_{LA} - \frac{1}{R}V_o \Bigg\} \quad (1)$$

On the basis of the above circuit equation, the following state equation can be obtained.

(Formula 4)

$$\dot{x}(t) = Ax(t) + Bu(t) \quad (2)$$

In this regard, x(t), A, B, u(t) are as below.

(Formula 5)

$$x(t) = [i_{LA}(t) \; v_o(t)]^T \\ u(t) = u_1(t) \\ A = \begin{bmatrix} 0 & -1/L_A \\ 1/C & -1/CR \end{bmatrix} \\ B = \frac{1}{L_A}\begin{bmatrix} 1 \\ 0 \end{bmatrix} \Bigg\} \quad (3)$$

<Derivation of Formula for Discrete Control Considering Delay Time>

Next, the state equation of the main circuit is used to derive a formula for discrete control. The general solutions obtained by the above state equations (2), (3) can be divided into sections, where an input u1(τ) is constant, and are expressed by the following Formula 4.

(Formula 6)

$$x(t) = e^{At}x(0) + \int_0^t e^{A(t-\sigma)}Bu_1(\sigma)d\sigma \quad (4)$$

The general solution of Formula 4 is used to derive a relational expression between the command value and the manipulated variable in the discrete control. There are delay times between the control conducted by the control unit (controller) and the operation in the main circuit due to acquisition delay occurring during acquisition of a detection value of the voltage or current in the detector, calculation delay occurring during calculation of the manipulated variable from the detection value in the control unit, operation delay occurring in the switching device in the main circuit from receiving a gate signal till going into operation. The delay time causes an error between a real circuit to be controlled and a control model, leading to a problem in the accuracy of the discrete control that may cause a controlled oscillation.

In order to take into consideration the delay time, the formula for the discrete control, into which the term of the delay time is introduced, is derived so as to derive the manipulated variable for controlling the output of the main circuit to the command value. The control circuit (controller) generates the pulse width ΔT(k) for controlling the output by turning on and off the input voltage as manipulated variable for controlling the switching of the main circuit based on the formula for the discrete control. The delay time is represented below as Td.

The switching operation of the switching circuit is implemented by a gate signal output from the control unit. The switching operation can be conducted with a single-phase gate signal as well as a multi-phase gate signal based on multiple phases (n-phase), and the switching operation with the multi-phase gate signal is multi-phase interleave.

Now, a description will be made first about the formula for discrete control in single-phase, and then about the formula for discrete control in multi-phase (n-phase). As to the multi-phase (n-phase) control, the description will refer to the three-phase control.

(Formula for Single-Phase Discrete Control)

Regarding the case of implementing the switching operation by single-phase, the derivation of the formula for discrete control in consideration the delay time Td will be described below.

Figure 3:
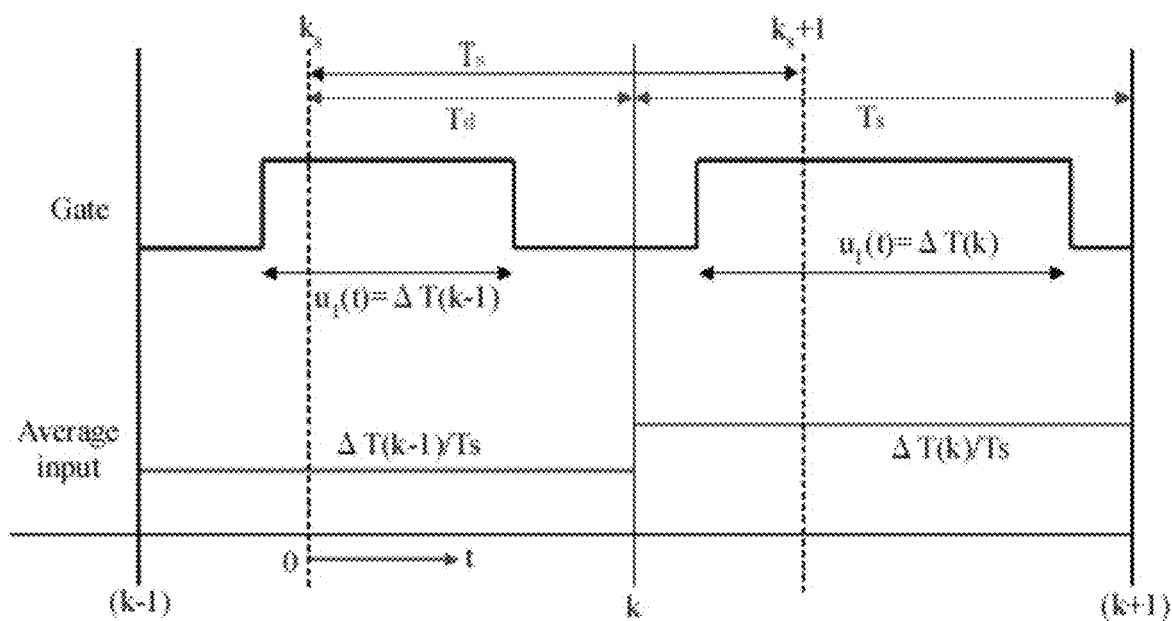
FIG. 3 is a diagram illustrating a relationship of delay times Td between a control circuit (controller) and a main circuit in the DC/DC converter according to the present invention.

The delay time Td varies in terms of time axis depending on the above-mentioned various factors. FIG. 3 illustrates a case assuming that the delay time Td is within one cycle of a sampling cycle Ts. In FIG. 3, k represents a control cycle in the main circuit and ks represents a control cycle (sampling cycle) of a control unit (controller).

The discrete control conducts the control after one cycle of the control cycle k of the main circuit so that an output of the main circuit follows a command value. Thus, at the point ks in the control cycle of the control unit (controller), the general solution of the state equation up to the point (k+1), which is the end of one cycle in the control cycle of the main circuit, is computed. In order to taking into consideration the delay time Td, the term of the delay time Td is introduced to the general solution to thereby obtain the pulse width ΔT(k) of the manipulated variable of the discrete control.

The control unit (controller) computes the manipulated variable at the point of ks for matching the controlled variable with the command value at the point (k+1) in the control cycle of the main circuit, and then obtain the pulse width ΔT(k) based on the manipulated variable. The switching circuit uses a gate signal formed on the basis of the obtained pulse width ΔT(k) to open and close the switching device of the main circuit.

In the state equations (2) and (3), the general solution x(t) of each state equation includes an inductance current iLA(t) and a detected output voltage vo(t).

In the computation of the manipulated variable, a value at each point in the control cycle is used for the inductance current iLA(t) in the equation. As the inductance current iLA(t) contains a ripple component at the time of switching, a current value varies in one cycle of the cycle k of the main circuit in the single-phase control. Thus, in addition to use the value at each point in the control cycle, a detection value of the inductance current iLA(t) may be obtained from an average value in one cycle of the cycle k of the main circuit so as to suppress the influence of fluctuations in the current value. Since the ripple component of the inductance current iLA(t) does not affect a rising voltage and a falling voltage of the detected output voltage vo, the fluctuation in the detected output voltage vo has no influence on the average value.

As to the input voltage u1(t), the value at each point in the control cycle is used in the equation. The input voltage u1(t) of the main circuit has a pulsed input waveform depending on the gate signal. Thus, in addition to use the value at each point in the control cycle, a detection value of the input voltage may also be obtained from an average value in one sampling cycle of the control cycle ks, in order to avoid fluctuations in the detected voltage value due to the difference in the sampling points. Since the input voltage u1(t) is output with a time width determined by a duty of the pulse width ΔT(t) of the gate signal for two values of the input voltage value Vin and a zero voltage, the average value of one sampling cycle of the control cycle ks is calculated as input voltage value Vin·Duty. In this context, the duty determined at the point (ks−1) is presented by a ratio ΔT(k−1)/Ts of a time width ΔT(k−1) of the gate signal with respect to the time width Ts for one cycle, and the duty of ΔT(k) derived from the detection value at the point ks is represented by a ratio ΔT(k)/Ts of the time width ΔT(k) of the gate signal with respect to the time width Ts for one cycle.

As described above, it is not necessary to use the average values for the inductance current iLA(t) of the detected current and the input voltage u1(t) depending on the number of the phases of the interleave and the delay time, so that the detection value at each point in the control cycle can be used.

By using the general solution of Formula 4, the pulse width ΔT(k) as the manipulated variable of the discrete control considering the delay time Td is expressed by the following Formula 5.

(Formula 7)

$$\Delta T(k) = \frac{L_A i_{LA}(k+1) - \left\{L_A - \frac{(T_s + T_d)^2}{2C}\right\} i_{LA-ave}(k_s)}{V_{in}} + \frac{(T_s + T_d)v_o(k_s) - \frac{(T_s + T_d)^2}{2C} i_R(k_s)}{V_{in}} - \frac{T_d}{T_s}\Delta T(k-1) \quad (5)$$

In Formula 5, the pulse width ΔT(k) in the cycle (k) of the main circuit has in the LC circuit a voltage component LA·iLA(k+1) in the inductance LA due to iLA(k+1) in the next cycle (k+1) of the main circuit, and a voltage component (LA−(Ts+Td)²/2C)·iLA−ave(ks) in the inductance LA and the condenser C due to iLA−ave(ks) as the average detected current in the control cycle (ks), as well as a ratio for the input voltage Vin of each voltage component of the voltage component ((Ts+Td)²/2C)·iR(ks) in the condenser C due to an input voltage (Ts+Td)·vo(ks), and a term (Td/Ts) ·ΔT(k−1) of the pulse width ΔT(k−1) in previous cycle (k−1).

In regard of the inductance, capacitance and the ratio for the input voltage Vin of each of a voltage component of each element of a resistance, the pulse width ΔT(k) has a term of time (Ts+Td) or (Ts+Td)² obtained by adding the delay time Td to the control cycle Ts. Furthermore, the previous pulse width ΔT(k−1) has a coefficient of the term of (Td/Ts) obtained by dividing the delay time Td by the control cycle Ts.

The pulse width $\Delta T(k)$ in Formula 5 shows the case where the average value of the inductance current is used as the detection value. In Formula 5, iLA-ave(ks) is the average value of the inductance current iLA and Vo(ks) is the detected output voltage vo. The average current iLA-ave of the inductance current at the point ks uses an average value of a period of [ks−1−ks], which is one cycle of the switching, and an average value input of [k−k+1] derived at the point ks uses the value Vin·Duty(=$\Delta T(k)$/(Ts).

The formula for the discrete control using the detection value at each point in the control cycle can be obtained in Formula 5 by using the detection value at each point in the control cycle instead of the average value.

Formula 5 is an approximate expression in which the general solution x(t) of the state equation is approximated by a quadratic expansion expression, and includes a quadratic term for (Ts+Td) that includes the delay time Td. The approximation of the general solution x(t) of the state equation by a higher-order expansion expression can increase the degree of approximation of the width $\Delta T(k)$.

The pulse width $\Delta T(k)$ expressed by Formula 5 includes the term of the delay time Td. By opening and closing the switching device of the main circuit based on the pulse width $\Delta T(k)$ including the term of the delay time Td, the control considering the delay time Td is implemented.

<Delay>

A description will be made on the delay time Td in the control cycle ks of the control unit (controller) with respect to the cycle k of the main circuit by referring to FIGS. 4 to 7.

<When there is No Delay>

Figure 4:
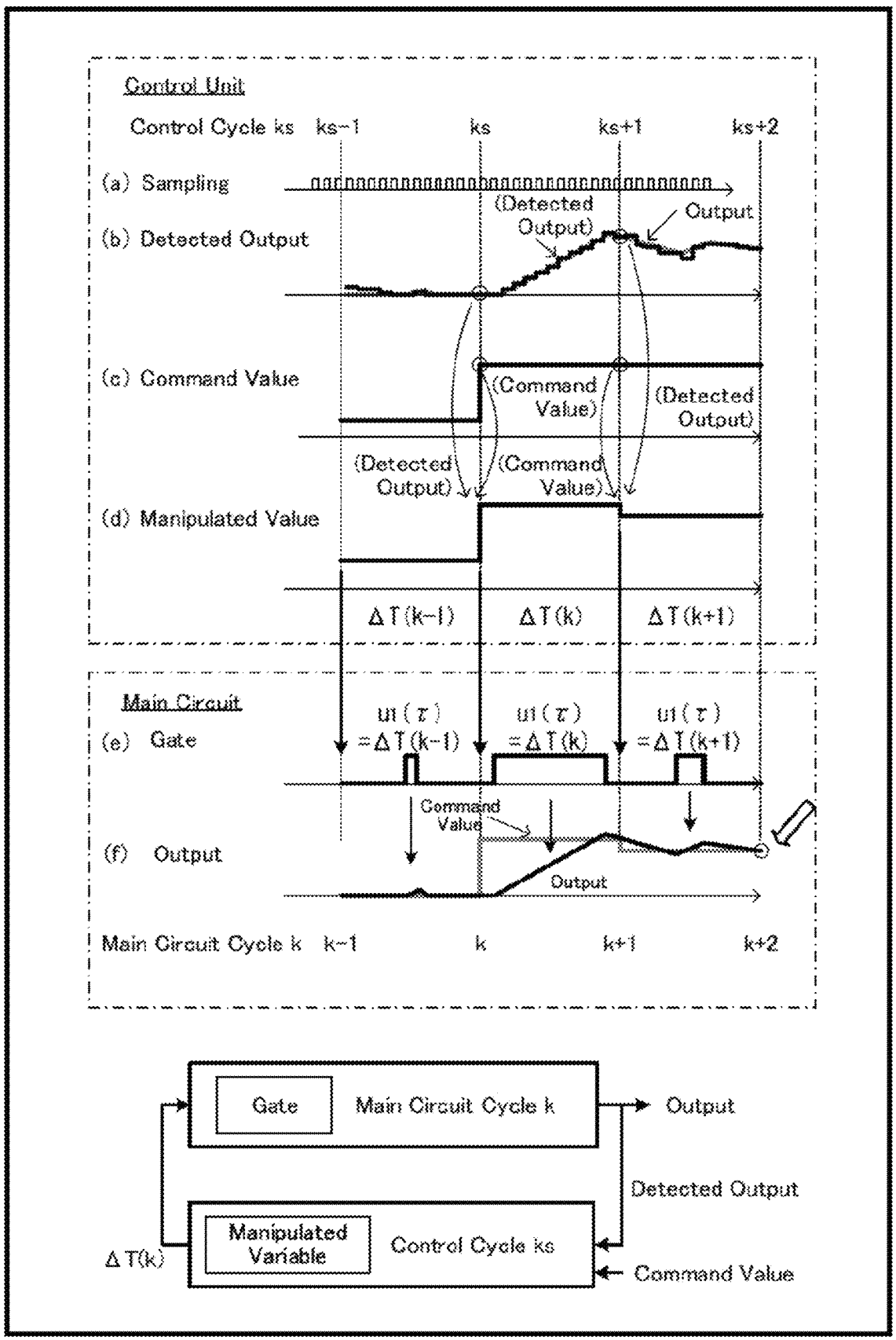
FIG. 4 is a diagram illustrating a case where the delay times Td do not occur in a cycle relationship between the control circuit (controller) and the main circuit.

FIG. 4 shows the case where no delay time Td occurs. In which case, the cycle k of the main circuit matches the control cycle ks of the control unit (controller).

FIGS. 4(a) to 4(d) respectively show the sampling, the detected output, the command value and the manipulated variable in the control unit (controller), and FIGS. 4(e) and 4(f) respectively show the gate signal and the output in the main circuit.

Since the cycle k of the main circuit matches the control cycle ks of the control unit (controller), no time lags occur between the detected output (b) and the output (f). At the point ks, the pulse width $\Delta T(k)$ as the manipulated variable is formed on the basis of the detected output (b) and the command value (c). The pulse width $\Delta T(k)$ is the manipulated variable for controlling the output at the point (k+1) to reach the command value. The main circuit performs the closing operation of the switching device with the pulse width $\Delta T(k)$ at the point ks in the control cycle between the point (k) and the point (k+1), thereby controlling the output to reach the command value at the point (k+1).

<When there is a Delay (but not Considering the Delay Time Td)>

Figure 5:
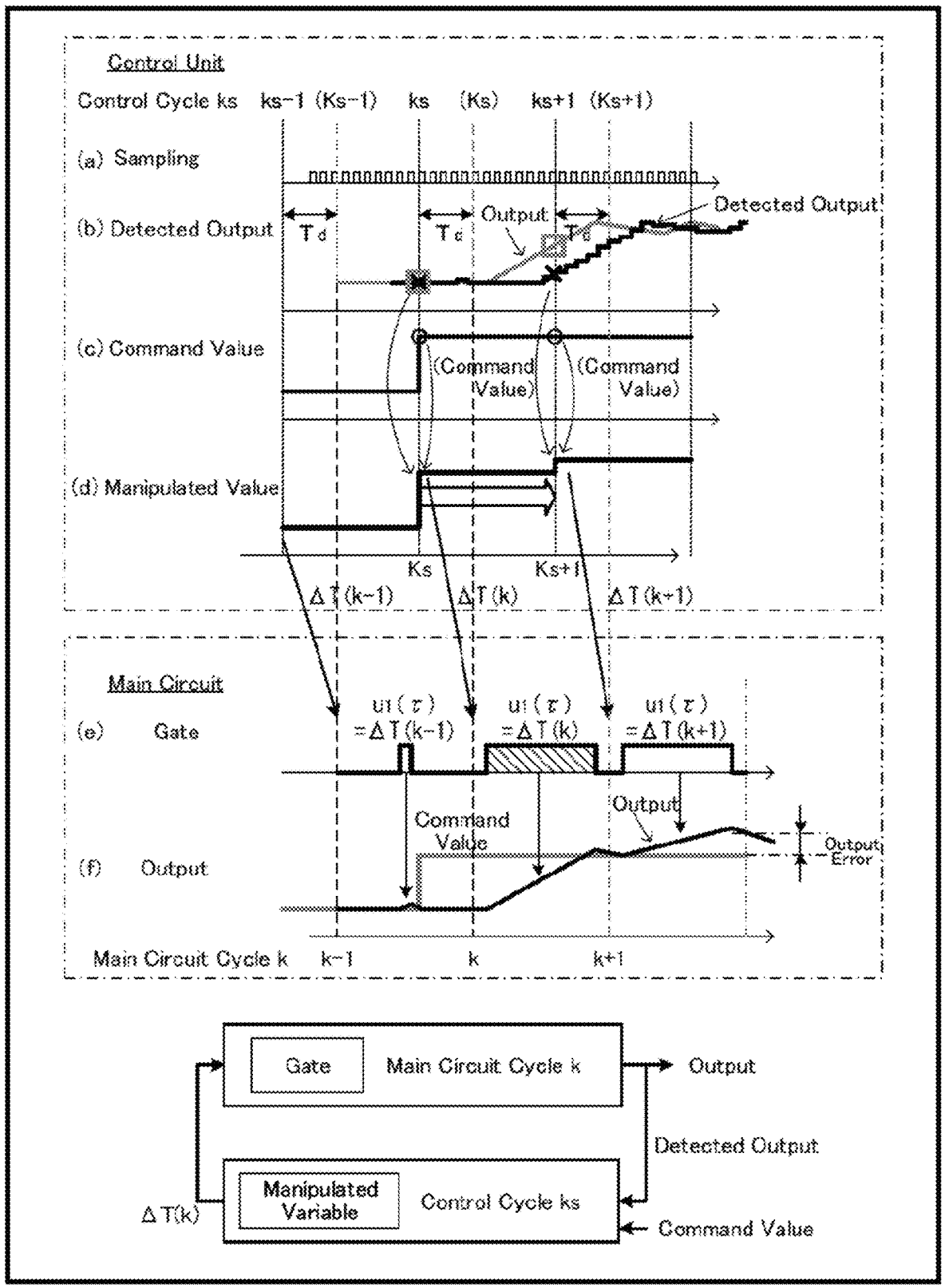
FIG. 5 is a diagram illustrating a case where the delay times Td occur in the cycle relationship between the control circuit (controller) and the main circuit.

FIG. 5 shows the case where there is a delay, but the delay time Td is not considered for the pulse width $\Delta T(k)$ as the manipulated variable in the discrete control. The delay causes a shift for the delay time Td between the cycle k of the main circuit and the control cycle ks of the control unit (controller).

FIGS. 5(a) to 5(d) respectively show the sampling, the detected output, the command value and the manipulated variable in the control unit (controller), and FIGS. 5(e) and 5(f) respectively show the gate signal and the output in the main circuit.

There is a shift of the delay time Td between the cycle k of the main circuit and the control cycle ks of the control unit (controller), and the detected output (b) of the control unit (controller) is detected with a delay of the value Td from the output (f) of the main circuit. The illustrated detected output (b) shows, for the point ks when there is no delay, an output waveform at the point ks which is previous point by the delay time Td.

The pulse width T(k) thus formed is a manipulated variable that makes the output to follow the command value at the point ks based on the detected output (b) and the command value (c) at the point ks. In the formation of the pulse width $\Delta T(k)$, the control cycle ks of the control unit (controller) lags behind the cycle k of the main circuit by the delay time Td, resulting in the occurrence of a detection error as shown in the detected output (b) between the output and the detected output. A detection error shown in FIG. 5(b) is a difference between the output, depicted by a square in the figure, and the detected output, depicted by a cross in the figure, and thus represents a detection error at the point (ks+1).

The main circuit obtains at the point k the pulse width $\Delta T(k)$ obtained at the point ks, which lags by the delay time Td, in the control cycle between the point k and the point (k+1), so as to perform the closing operation of the switching device. Since the pulse width $\Delta T(k)$ as the manipulated variable of the main circuit is formed based on the detected output including an output error caused by the delay time Td, sufficient time cannot gained to complete the gate control of the pulse width $\Delta T(k)$ between the points [ks−ks+1], and consequently the output controlled by the pulse width $\Delta T(k)$ has an output error (FIG. 5(f)) with respect to the command value. The error in the detection value and the error in the output become factors for oscillation.

<When there is a Delay (Considering the Delay Time Td)>

Figure 6:
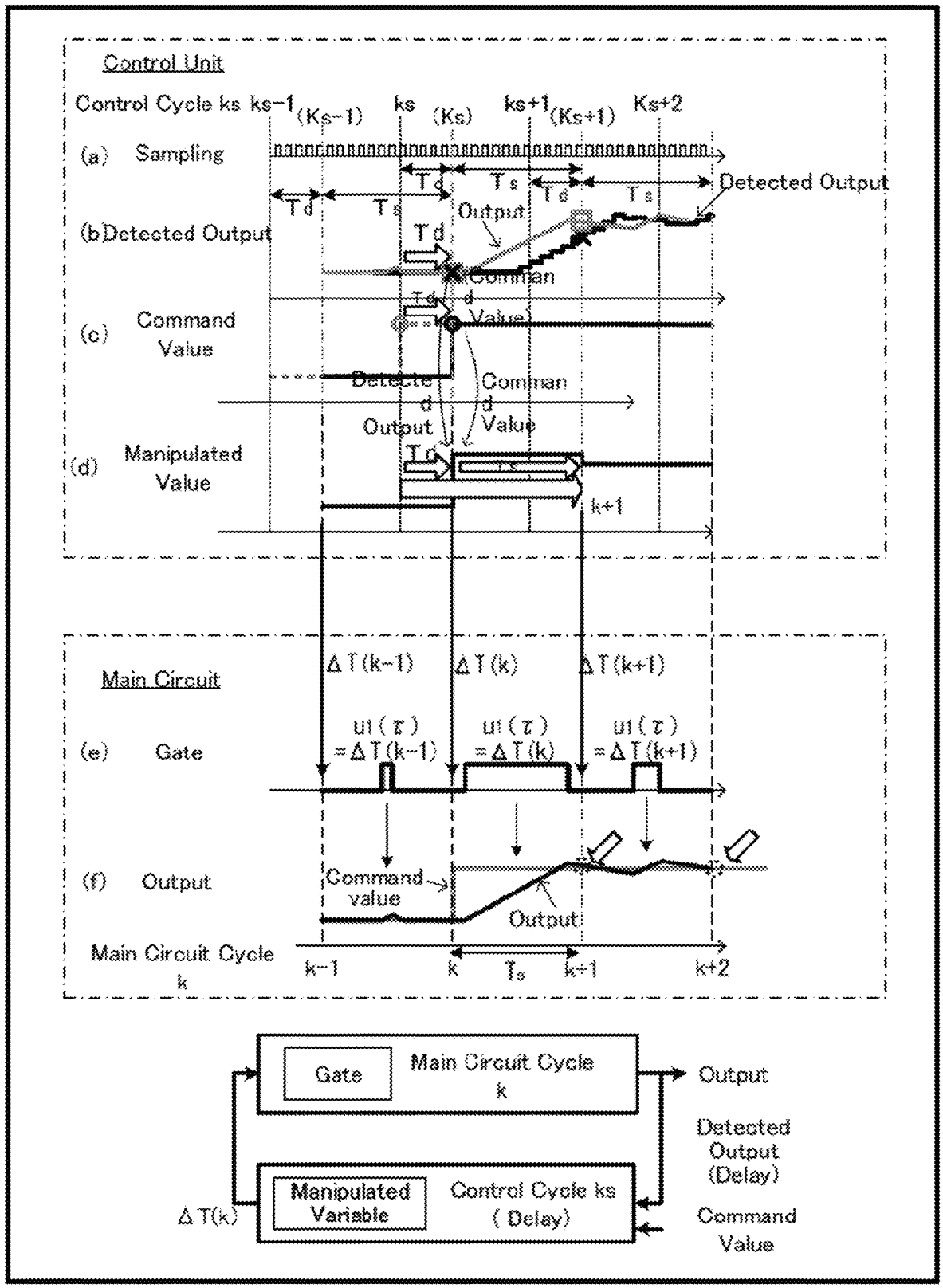
FIG. 6 is a diagram illustrating a case where the delay times Td occur in the cycle relationship between the control circuit (controller) and the main circuit in the present invention.

FIG. 6 shows the case where there is a delay and the delay time Td is considered for the pulse width $\Delta T(k)$ as the manipulated variable in the discrete control. An acquisition delay occurring in the detector when obtaining the detection values of the voltage and the current, a computation delay occurring during the computation of the manipulated variables for the discrete control and others, and a delay, such as response delay, in the switching device of the DC/DC converter cause a shift in the delay time Td between the cycle k of the main circuit and the control cycle ks of the control unit (controller).

As with the case of the control with no delay shown in FIG. 4, if the point (ks+1) is predicted by using the value at the point ks, an error occurs in the manipulated variable because the detected output for obtaining the manipulated variable includes a delay amount due to the shift in the delay time Td.

Thus, in order to prevent the error due to the delay time Td, the control according to the present invention makes a prediction in the control cycle period [ks−ks+1] of the control unit about the point ((ks+1)+Td) after the delay time Td from the point (ks+1), instead of the point (ks+1) using the value of the detection signal at the point ks. This predicted point is the point (k+1) in the control cycle of the main circuit. The discrete control at the point ks obtains the manipulated variable (pulse width $\Delta T(k)$) for allowing an object to be controlled to follow the command value at the point (k+1) which is after a lapse of the time ((ks+1)+Td) from the point ks.

FIGS. 6(a) to 6(d) respectively show the sampling, the detected output, an estimated output (average value), the command value and the manipulated variable of the control unit (controller), and FIGS. 6(e) and 6(f) respectively show the gate signal and the output in the main circuit.

Since there is a lag of the time delay Td between the cycle k of the main circuit and the control cycle ks of the control unit (controller), the detected output (b) is detected with a delay of Td from the output. The detected output in FIG. 6(*b*) (shown by a thick line) indicates the state where the detected output is detected with the lag of the delay time Td behind the output (shown by a thin line).

The present invention forms the pulse width ΔT(k) as a manipulated variable at the point (k+1) based on the detected output (b) at the point ks and the command value (c), as well as the previous pulse width ΔT(k−1).

Since the detection value at the point ks used by forming the pulse width ΔT(k) at the point k is a value with the lag of the delay time Td, not the value at the point k, the delay time Td is compensated with respect to the previous pulse width ΔT(k−1) and the detection value at the point ks so as to obtain the value at the point k that is a point after the delay time Td from the point ks. The compensation of the delay time Td in the pulse width ΔT(k) can eliminate the detection error caused by the delay time Td.

Due to the delay time Td occurring in the control unit, the pulse cycle ks on the control side is recognized by the main circuit side as delaying by the time Td, while the cycle k on the main circuit side is recognized by the control side as advancing by the delay time Td.

In this way, since the detection value at the point ks of the control unit delays by the delay time Td as viewed from the main circuit side, the detection value of the control unit has the delay by the delay time Td at the point k of the main circuit. The present invention obtains the value by compensating the delay time Td with respect to the previous pulse width ΔT(k−1) and the detection value at the point ks on the control side, thereby using the compensated value to form the pulse width ΔT(k) at the point k. The pulse width ΔT(k) is a manipulated variable for performing control in the cycle k from the point k of the main circuit.

Although the main circuit advances by the delay time Td viewed from the control side, the error caused by the delay time Td is eliminated by controlling the gate using the manipulated variable of the pulse width ΔT(k) in which the delay time Td is compensated. In this case, the cycle k of the main circuit is a period between the point k and the point (k+1), and the gate is controlled by the manipulated variable of the pulse width ΔT(k) in this period.

In this context, the detection value to be used for forming the pulse width ΔT(k) between [k−k+1] in the cycle k applies the detection value at point ks which is before the point k by the delay time Td as the value at the point k without being processed, as well as an estimated value obtained from a value within a predetermined period in the pulse cycle ks before the point ks. The use of the estimated value obtained from the value within the predetermined period enables to avoid the detection error caused by the fluctuation in the detection value within the pulse cycle ks.

In the estimation of the detection value using the value within the predetermined period, for instance, an average value of an detection value of the capacitance current ic in the period of [ks−1−ks] is computed, and then the estimated value according to the average value is defined as the detection value of the capacitance current ic at the point ks, so as to use the detection value to form the pulse width ΔT(k) for performing the gate control in the period of [k−k+1] in the cycle k.

In the formation of the pulse with ΔT(k), although the control cycle ks of the control unit (controller) lags behind the cycle k of the main circuit by the delay time Td, the prediction is made on the point (k+1) in the control cycle of the main circuit which is the point ((ks+1)+Td) behind the point (ks+1) by the delay time Td, not on the point (ks+1). The main circuit performs the closing operation of the switching device by the pulse width ΔT(k) obtained at the point ks which lags by the delay time Td in the control cycle [k−k+1] between the point k and the point (k+1).

The pulse width ΔT(k) expressed by the above Formula 5, which is the manipulated variable of the discrete control considering the delay time Td, takes account of the term of time (Ts+Td) of the control cycle Ts that is equivalent to the delay time Td and the point (k+1) in the control cycle.

On the control unit (controller) side, a value detected at a point, which lags behind the point ks by the delay time Td, matches the cycle k on the main circuit side. Thus, when viewed from the main circuit side, the manipulated variable obtained in the cycle k of the main circuit (pulse width ΔT(k)) is a manipulated variable that recognizes accurately the state of the main circuit, and consequently the error between the main circuit and the control side due to the delay time Td is eliminated.

This allows enough time for the gate control of the pulse width ΔT(k), thereby suppressing the output error between the output controlled by the pulse width ΔT(k) and the command value (circle drawn by a dashed line in FIG. 6). FIG. 6(*b*) shows a detection error (difference between the output and the detected output) at the point (ks+1).

(When Delay Time Td Exceeds One Control Cycle Ts)

The derivation of the above expression of the discrete control considering the delay time Td has been described on the assumption that the delay time Td is within one sampling cycle Ts in the cycle k of the main circuit. Alternatively, the manipulated variable (pulse width ΔT(k)) can be determined by a similar technique by extending the predicted point according to the delay time Td when the delay time Td exceeds one sample cycle Ts of the cycle k of the main circuit.

Figure 7:
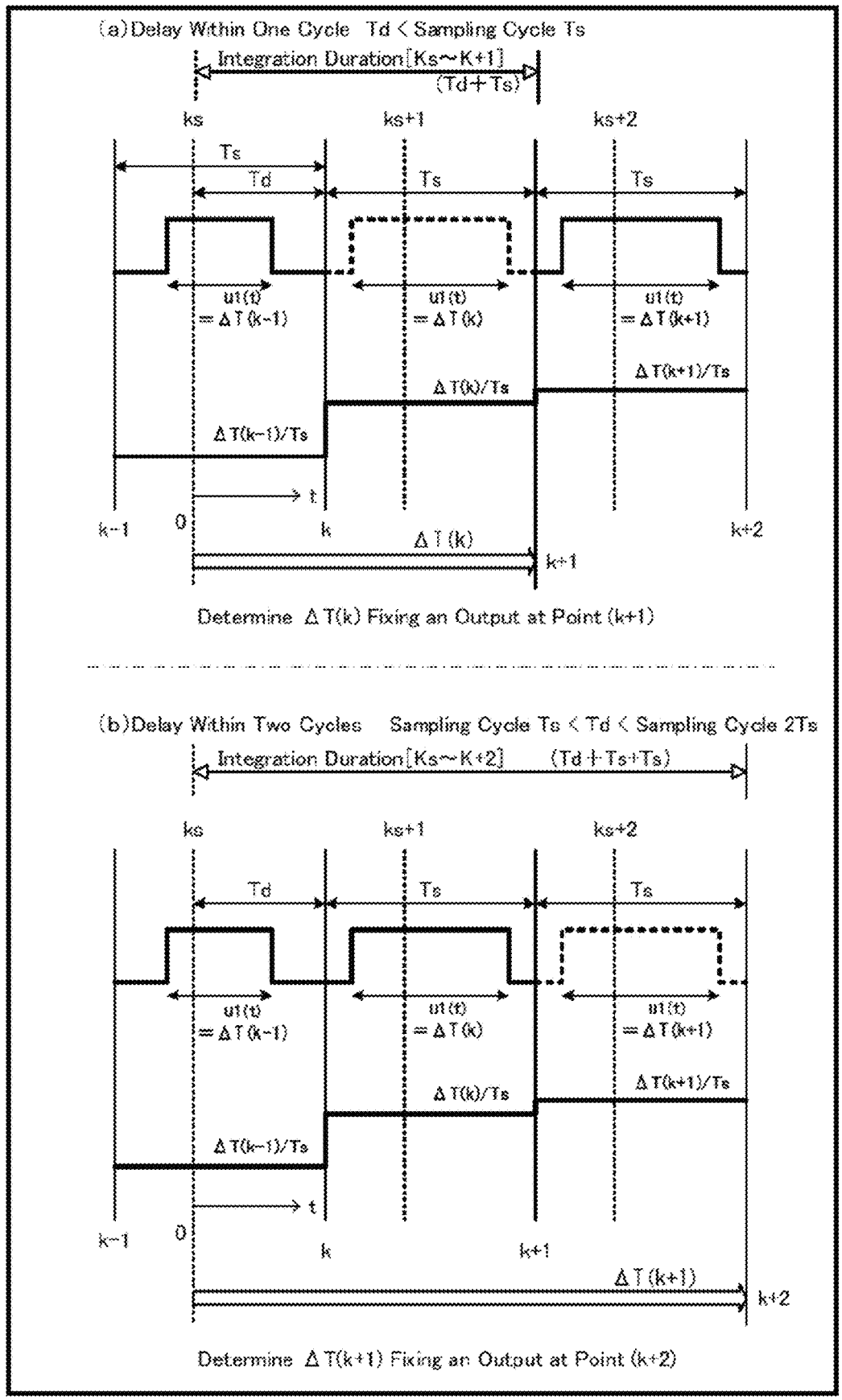
FIG. 7 is a diagram illustrating a relationship between a control period Ts and the delay time Td as well as an integration period.

FIG. 7(*a*) illustrates a case where the delay time Td is within one sampling cycle Ts, and FIG. 7(*b*) illustrates a case where the delay time Td is over one sampling cycle Ts and within two sampling cycle 2 Ts.

As shown in FIG. 7(*a*), when the delay is within one sampling cycle Ts in the control cycle ks, a prediction is made based on the detected output at the point ks and the command value about the point (k+1) in the control cycle of the main circuit, which is the point (Ts+Td) after the point ks by the delay time Td in one sampling cycle Ts. In the case of the multi-phase interleaving, a prediction is also made about the point (k+1) in the control cycle of the main circuit, which is the point (Ts+Td) after the point ks by the delay time Td in one sampling cycle Ts.

The duration [ks−k+1] is used as an integration duration in the state equation with respect to the point ks to predict the point (k+1) after (Ts+Td), in order to perform the switching control with the pulse width ΔT(k) in a control duration of [k−k+1].

In FIG. 7(*b*), when the delay is over one sampling cycle Ts and within two sampling cycles 2 Ts in the control cycle ks, a prediction is made based on the detected output at the point ks and the command value about a point (k+2) in the control cycle of the main circuit after the point ks by (Ts+Td) obtained by adding the delay time Td and the sampling cycle Ts. Since the delay time Td exceeds one sampling cycle Ts, the point after the point ks by (Ts+Td) becomes the point (k+2).

The duration [ks−k+2] is used as an integration duration in the state equation with respect to the point ks to predict the point (k+2) after (2 Ts+Td), in order to perform the switching control with the pulse width ΔT(k) in a control duration of [k+1–k+2].

(Three-Phase Interleaving Discrete Control)

In the single-phase discrete control described above, the manipulated variable for the single-phase discrete control has been presented. Now, in the case of employing a multi-phase interleaving system that is a technique for increasing the speed of a DC/DC converter in order to speed-up the DC/DC converter, a description will be made about a three-phase discrete control that enhances a manipulated variable for the discrete control of a three-phase interleaved step-down DC/DC converter.

Figure 8:
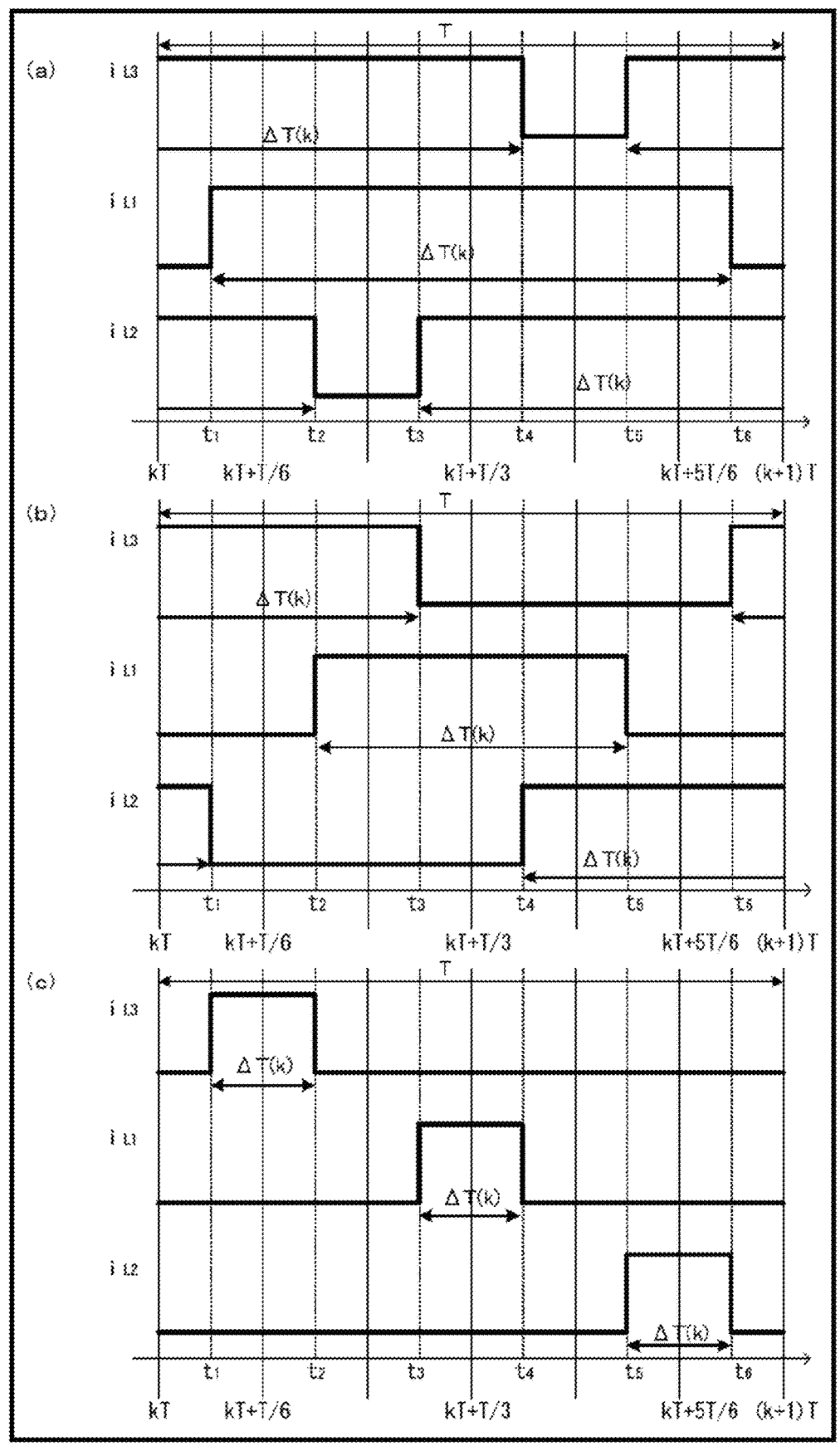
FIG. 8 is a diagram illustrating an example of applying a three-phase interleaving system.

FIG. 8 illustrates the application of the three-phase interleaving system as multi-phase interleaving system, showing an example of a pulse width ΔT(k) for a three-phase current.

In the three-phase interleaving system, each phase of the three-phase is shifted by 120 degrees to triple a ripple frequency. Thus, in the three-phase interleaving system, an output ripple equivalent to that in the single-phase system can be achieved with one-third of the output capacitor's ability, thereby increasing the speed of an operation of switching to the voltage level of the DC/DC converter.

FIG. 8(a) illustrates that the pulse widths ΔT(k) of three phase currents in the three-phase current are overlapped one another in the time width T in one cycle of the switching. FIG. 8(b) illustrates that the pulse widths ΔT(k) of two phases currents in the three-phase current are overlapped each other in the time width Ts in one cycle of the switching. FIG. 8(c) illustrates that there is no overlapping of the pulse widths ΔT(k) of the phase currents regarding the three-phase current.

When the switching operation is carried out on the switching circuit 3 by the multi-phase interleaving of n-phase, the n-inductances L (L1 to Ln) included in the LC chopper circuit of the main circuit 2 are fed with inductance currents iL to iLn, respectively. The control unit 6 inputs as control current a current containing a combined current iL which is obtained by combining the phase current values of the inductance currents iL to iLn.

The control current may apply a capacitance current iC, obtained by subtracting the load current iR from the combined current iL, in addition to the combined current iL obtained by combining the inductance currents of the phase currents.

In the single-phase discrete control, the manipulated variable for the discrete control by taking into consideration the delay time Td is expressed by Formula 5. By extending the pulse width ΔT(k) to the three-phase interleaved step-down DC/DC converter, the manipulated variable for the discrete control considering the delay time Td can be obtained in a converter with the increasing speed by the three-phase interleaving system. Here, the description refers to the three-phase interleaving system by way of example of the multi-interleaving, and thus the pulse width can also be applied to other multi-interleaving system with more than three phases.

Figure 9:
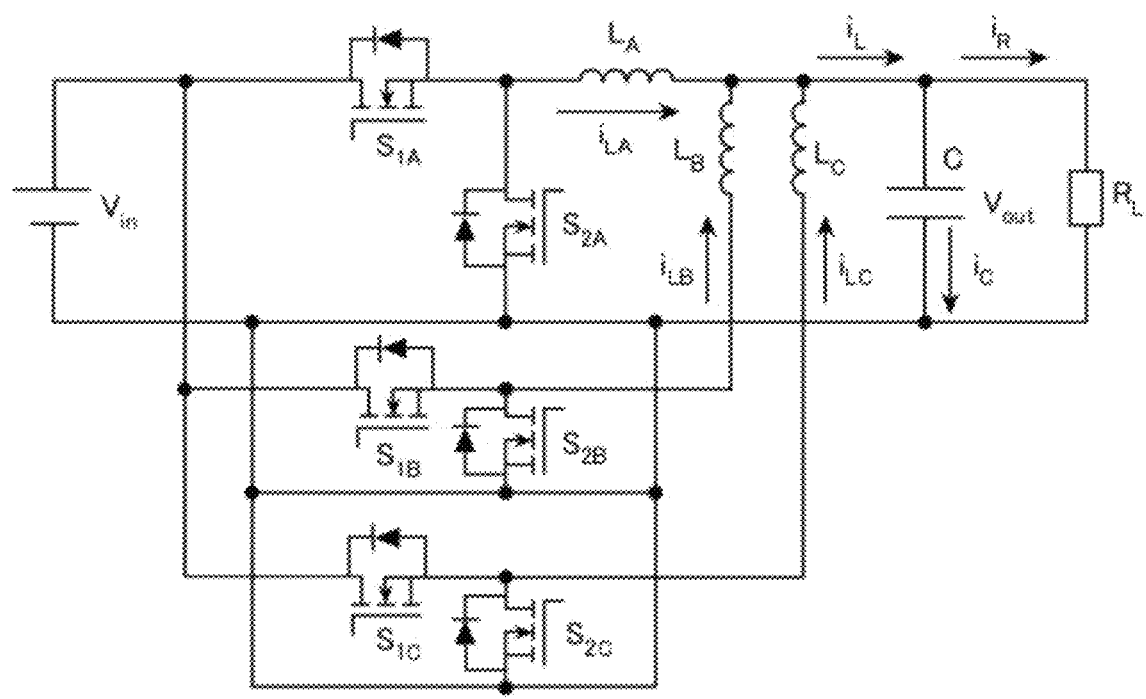
FIG. 9 is a diagram illustrating a schematic configuration of step-down DC/DC converter by the three-phase interleaving system.
Figure 10:
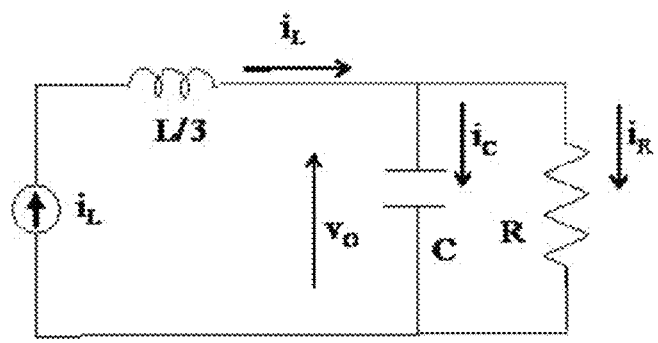
FIG. 10 is a diagram illustrating an equivalent circuit of the step-down DC/DC converter of FIG. 9.
Figure 10:
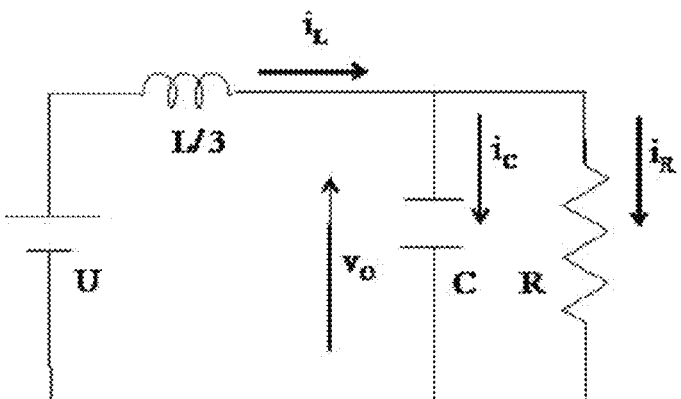

FIG. 9 shows a schematic configuration of the step-down DC/DC converter by the three-phase interleaving system. Switching devices S1A, S2A and an inductance LA, switching devices S1B, S2B and an inductance LB, as well as switching devices S1C, S2C and an inductance LC respectively configure each phase of the three phases, and have a common capacitance C and load resistance RL.

Expressions of the constant-current control for detecting the combined current as control current and of the control current and the output voltage for the constant-voltage control are derived. FIGS. 10(a) and 10(b) show equivalent circuits for the three-phase interleaving step-down DC/DC converter circuit shown in FIG. 9, which represent equivalent circuits for time-bandwidth that is sufficiently longer than a switching frequency in the region of a closed-loop automatic controlled response.

<Constant-Voltage Control>

The equivalent circuit of an LCR circuit in FIG. 10(b) illustrates the constant-voltage control for detecting a detected output voltage vo. In this figure, shown is an example of a DC/DC converter that includes a step-down chopper circuit consisting of the LCR circuit.

In the equivalent circuit of the LCR circuit, the detected output voltage vo obtained in a step response by inputting an input voltage U is expressed by the following formula.

(Formula 8)

$$v_o(s) = \frac{\frac{R}{1+sCR_L}}{sL/3 + \frac{R_L}{1+sCR_L}} \frac{U}{s} = \frac{\frac{3}{LC}}{s^2 + \frac{1}{CR_L}s + \frac{3}{LC}} \frac{U}{s} = \frac{\omega_n^2}{s^2 + 2\zeta\omega_n s + \omega_n^2} \frac{U}{s} \quad (6)$$

The above Formula 6 indicates that the detected output voltage vo is a secondary oscillation voltage, which suggests the occurrence of an overshoot and an undershoot.

<Constant-Current Control>

In the equivalent circuit in FIG. 10(a), a combined current (iLA+iLB+iLC=iL) composed of the phase currents iLA, iLB and iLC of each phase is represented as a current source, and a combined inductance consisting of the inductances L of three switching circuits is represented as (L/3). In this equivalent circuit, the step response of the detected output voltage vo due to the input current (iL) from the current source is expressed by the following formula.

(Formula 9)

$$v_o(s) = \frac{R_L}{1+sCR_L} \frac{i_L}{s} = Ri_L\left(\frac{1}{s} - \frac{1}{s+1/CR_L}\right) \quad (7)$$

$$v_o(t) = R_L i_L \left(1 - e^{-\frac{1}{CR_L}t}\right)$$

Formula 7 indicates that the step response of the detected output voltage vo increases in an exponential manner toward (RL·iL) without producing the secondary oscillation voltage.

A time function iL(t) of the combined current of the inductance current iL is defined by the following Formula 8.

(Formula 10)

$$i_L(t)=i_c(t)+i_R(t)=A_V(V_{REF}-v_o(t))+i_R(t) \quad (8)$$

A combined current (iL(t)), a capacitance current iC(t) and a detected output voltage vo(t) are expressed by the following Formula 9.

(Formula 11)

$$i_L(t) = i_C(t) + i_R(t) = A_V\{V_{REF} - v_o(t)\} + i_R(t) \quad (9)$$

$$i_C(t) = A_V\{V_{REF} - v_o(t)\} = C\frac{d}{dt}v_o(t)$$

$$v_o(t) = V_{REF}\left\{1 - e^{-\frac{A_V}{C}t}\right\}$$

The detected output voltage vo(t) expressed by Formula 9 indicates that the load resistance RL is removed from the detected output voltage vo(t) expressed by Formula 7, and a final value after a lapse of sufficient time (t→∞) converges at a command voltage Vref.

Thus, the constant-current control using the combined current of the inductance current iL(t) shown in Formula 8 as control current enables to control the step response without producing the secondary oscillation voltage.

In the detected output voltage vo(t) expressed by Formula 9, Av is a coefficient with which a difference value (Vref−Vo(t)) between the detected output voltage vo(t) and the command voltage Vref is multiplied. For example, the larger the coefficient Av, more strongly the step response reflects the difference value (Vref−Vo(t)).

<State Equation of Bilateral Step-Down Chopper Circuit>

Figure 11:
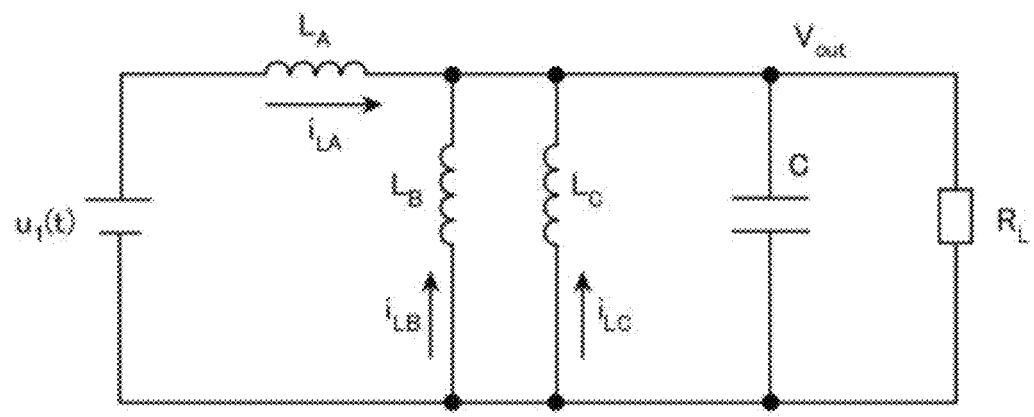
FIG. 11 is a diagram illustrating an equivalent circuit which is one phase of bidirectional step-down chopper circuit by the three-phase interleaving system.
Figure 12:
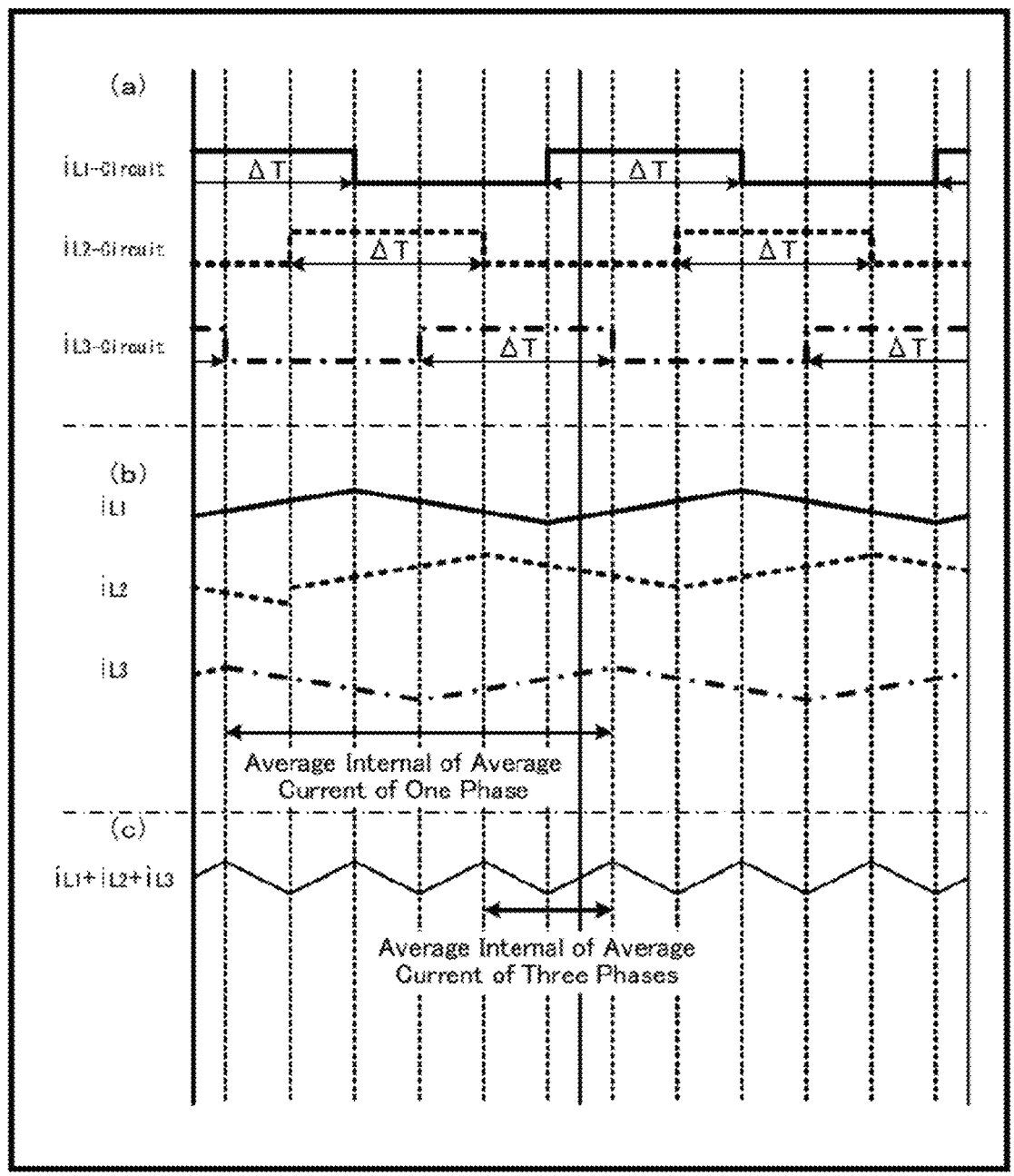
FIG. 12 is a diagram illustrating an average period for obtaining an average current.

Next, a state equation of a bilateral step-down chopper circuit by the three-phase interleaving system is derived. FIG. 11 shows an equivalent circuit of one of three phases. In order to convert the combined current (iL) expressed by the above Formal 8 into a form suitable for the constant-current control, the state equation of the combined current iL(=iL1+iL2+iL3) obtained from values iL1, iL2 and iL3 shown in FIG. 9 is determined to derive a relational expression with respect to the pulse width ΔT.

The ON/OFF operations are performed on the phases S1A to S1C and S2A to S2C shown in FIG. 9, so that a voltage of Vin or zero is applied across u1(τ), u2(τ) and u3(τ). If the superposition theory is applied, u1(τ) is represented by an equivalent circuit shown in FIG. 11. In FIG. 11, when the device S1A is turned on and the device S2A is turned off, u1(τ) becomes Vin, and when the device S1A is turned off and the device S2A is turned on, u1(τ) becomes zero. In this regard, the inputs Vin in the devices SB and S2B as well as the devices S1C and S2C are in a short circuit condition.

Provided that LA=LB=LC=L, the state equations for the voltages u1(t), u2(t) and u3(t) are determined in FIG. 11, so as to obtain the state equation for the three-phase interleaved step-down DC/DC converter according to the theory of the superposition of these voltages.

(Formula 12)

$$\dot{x}(t) = A_2 x(t) + B_2 u(t) \quad (10)$$

In this regard, x(t) represents currents iLA(t), iLB(t) and iLC(t) of the inductances LA, LB and LC, respectively, and is also an element of the detected output voltage vo(t), u(t) represents input voltages u1(t), u2(t) and u3(t) of the respective phases, A2 represents the term of a coefficient consisting of the elements of the inductance L, the capacitance C and the resistance R in each phase, and B2 represents the term of a coefficient consisting of the element of the inductance L in each phase.

As with the case of the above-described single-phase, provide that a duty in the period of [(ks−1)−k] is ΔT(k−1)/Ts and a duty in the period of [k−(k+1)] is ΔT(k)/Ts, the pulse width ΔT(k) as manipulated variable is computed by the following Formula 11.

(Formula 13)

$$\Delta T(k) = \frac{\frac{L}{3}i_L(k+1) - \left\{\frac{L}{3} - \frac{(T_s + T_d)^2}{2C}\right\}i_{L-ave}(k_s)}{V_{in}} + \frac{(T_s + T_d)v_o(k_s) - \frac{(T_s + T_d)^2}{2C}i_R(k_s)}{V_{in}} - \frac{T_d}{T_s}\Delta T(k-1) \quad (11)$$

Thus, the expression of the discrete control considering the delay time Td based on the manipulated variable as ΔT(k) and the command value as iL(k+1) is derived by Formula 5 in the case of the single-phase and Formula 11 in the case of the three-phase.

The pulse width ΔT(k) of n-phase is expressed by the following formula.

(Formula 14)

$$\Delta T(k) = \frac{\frac{L}{n}i_L(k+1) - \left\{\frac{L}{n} - \frac{(T_s + T_d)^2}{2C}\right\}i_{L-ave}(k_s)}{V_{in}} + \frac{(T_s + T_d)v_o(k_s) - \frac{(T_s + T_d)^2}{2C}i_R(k_s)}{V_{in}} - \frac{T_d}{T_s}\Delta T(k-1) \quad (12)$$

(In the Case of Multi-Phase Interleaving)

In the above description, the switching operation is conducted by using the single-phase gate signal. Correspondingly, the switching operation by the multi-phase interleaving can be performed with a multi-phase gate signal.

As with the switching operation by the single-phase gate signal, when the delay time Td is within the sampling cycle Ts, the multi-phase switching operation makes a prediction based on the detected output and the command value at the point ks about the point (k+1) in the control cycle of the main circuit, which is the point of (Ts+Td) from the point ks obtained by adding the delay time Td to the sampling cycle Ts.

In the multi-phase switching operation, if an estimated value according to the average value is used as the detection value at the point ks to be used for computation in the computation of the pulse width ΔT(k) as the manipulated variable, a ripple cycle Tr is adopted in an average period, instead of the sampling cycle Ts. For example, in the three-phase interleaving consisting of A-phase, B-phase and C-phase, if the delay time Td is shorter than the sampling cycle Ts, a prediction is made at a point ksA in the A-phase about a point kA+1 of the main circuit by taking account of the delay by the delay time Td to thereby determine the pulse width ΔT(k) in the period [kA−kA+1] in the cycle k of the main circuit cycle.

In this case, an average value in a period of a control cycle [ksC−1−ksA] is used as the detection value at the point ksA in the condenser current iC. In this context, the point ksC−1 is a point in the C-phase in the cycle ks, and time width of the control cycle is one ripple cycle Tr(=Ts/3). In the n-phase, one ripple cycle Tr is Ts/n.

At the sampling point ks, the delay time Td is considered to predict the point (k+1) in the main circuit so as to determine the pulse width ΔT(k) of [k–k+1]. At this time, if the average value is applied as detection value, an average value in a period before the point k by (ripple cycle Tr of the single-phase+delay time Td).

Moreover, when the delay time Td is one sampling cycle Ts or more and two sampling cycles 2 Ts or less, a point (k+2) in the control cycle of the main circuit that is a point (nTs+Td) after the time delay Td in a n-sampling cycle Ts from the point ks is predicted based on the detected output or estimated value at the point ks and the command value. In this case, since the delay time Td exceeds one sampling cycle Ts, the point after (nTs+Td) from the point ks becomes the point (k+2).

In the case of the single phase, the pulse width ΔT(k) is determined for every sampling cycle Ts. In the case of the three phases, if the time delay Td is in [0–Ts], the pulse width ΔT(k) of [k–k+1] is determined at the point ks in the same way as the case of the single phase, and if the delay time Td is in [Ts–2 Ts], the pulse width ΔT(k) of [k+1–k+2] is determined at the point ks.

In the discrete control by the three-phase interleaving system, as with the case of the single-phase discrete control, the detection value of the inductance current iLA(t) is obtained from the average value in order to suppress the influence by the fluctuation in the detection value due to the ripple component contained in the inductance current to be detected.

A period during which the current fluctuates periodically corresponds to one cycle of the ripple frequency. This period of one cycle of the ripple frequency is defined as an acquisition period for acquiring the average value, so that the fluctuation caused by the ripple component is averaged. In the case of the single phase, the acquisition period for acquiring the average value of the detection value is defined to be one cycle of the cycle k of the main circuit which is one cycle of the ripple frequency. One cycle of the cycle k of the main circuit is one cycle of the switching operation of the switching device in the main circuit.

In the three-phase interleaving system, the above-described period is also defined to be one cycle of the ripple frequency. One cycle of the ripple frequency is ⅓ of the cycle k of the main circuit for the switching in the case of the three-phase system. Correspondingly, in the multi-phase interleaving of n-phase, which is more than three phases, the average value is determined by considering the acquisition period as 1/n cycle of the cycle k of the main circuit for switching.

FIG. 12(a) shows an ON/OFF state of a three-phase switching circuit, FIG. 12(b) shows inductance currents iL1 to iL3 flown by the single-phase switching, and FIG. 12(c) shows the combined current (iL1+iL2+iL3) flown by the three-phase switching. A period for obtaining an average current is one cycle of the switching cycle in the single-phase, whereas the period in the three-phase is ⅓ of the switching cycle.

(Discrete Control by Capacitance Current iC)

Formula 5 for the single-phase discrete control and Formula 12 for the multi-phase discrete control by considering the delay time Td derive the inductance current iL(k+1) as command value.

However, there are possible delay times beyond the controlling cycle in a DC current sensor for detecting the inductance current iL and an isolated amplifier for detecting the detected output voltage vo. In such a case, it is not expected that the pulse width ΔT(k) derived by Formula 5 or Formula 12 will attain the stability adequate to the switching operation.

(Discrete Control Using Capacitor Current iC as Detection Value)

In order to eliminate an excessive delay caused by using the inductance current iL as detection value, the inductance current iL detected by the DC current sensor is replaced with the capacitance current iC detected by an AC current sensor to conduct the discrete control on a control system using the capacitance current iC as the detection value. As the AC current sensor can perform fast detection, the occurrence of delay is reduced in the detection.

Now, a description will be made on the combination of the constant-current control and the constant-voltage control in the discrete control of the switching operation of the voltage level of the DC/DC converter.

First, a description will be made about the constant-voltage discrete control, the constant-current discrete control, and the combination of the constant-voltage discrete control and the constant-current discrete control in the case of where no delay occurs, and then a description will be made about a modal control of the discrete control in the case of where a delay occurs. In regard of the modal control of the discrete control, a description will be made on the control by taking into consideration the overshoot and the undershoot occurring during switching from the constant-current control to the constant-voltage control as well as the delay time. The following description about each type of discrete control illustrates High/Law two-level control that switches the voltage level between a high voltage level (High level) and a low voltage level (Low level).

FIGS. 12(b) and 12(c) schematically show current waveforms for illustrative purposes, and do not show actual waveforms.

<Controlling Form by Combination of Constant-Voltage Control and Constant-Current Control>

A description will be made about a controlling form by the combination of the constant-voltage control and the constant-current control in the High/Low two-level control, by referring to FIG. 13.

In this controlling form, the constant-voltage control and the constant-current control are carried out in combination to effect a transition between two levels for switching a power level from a low power side to a high power side and switching the power level from the high power side to the low power side.

Figure 13:
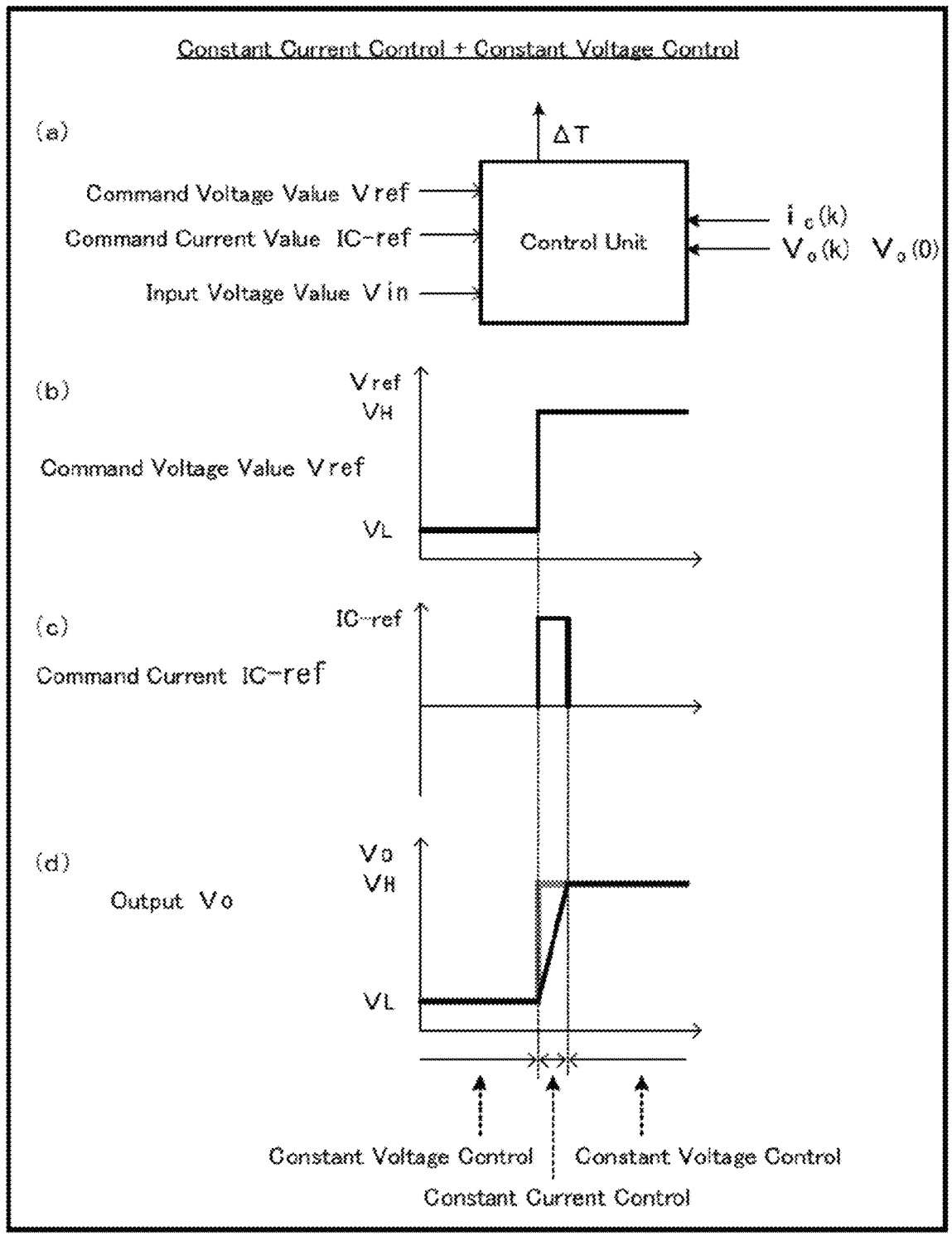
FIG. 13 is a diagram illustrating a controlling form by a combination of constant-voltage control and constant-current control.

FIG. 13 illustrates the controlling form by the combination of the constant-voltage control and the constant-current control, wherein FIG. 13(a) shows a schematic configuration of the control unit, FIGS. 13(b) and 13(c) show the command voltage Vref and a command current IC-ref, and FIG. 13(d) shows the detected output voltage vo. In this figure, the capacitance current iC is used as the detected current.

The constant-voltage control is performed in the retention period in which the command voltage is retained on the low power side and the high power side, and the constant-current control is performed in the transition period in which the power level is switched from the low power side to the high power side.

The constant-voltage control uses the pulse width ΔT(k) expressed by the following Formula 13 or 14 to retain the command voltage Vref.

(Formula 15)

$$\Delta T(k) = \frac{1}{V_{in}(k)} \frac{L}{3} \left[ A_v V_{ref} - \left(1 - \frac{3T_s^2}{2LC}\right) i_C(k) + \left(\frac{3}{L} T_s - A_v\right) v_o(k) \right] \quad (13)$$

(Formula 16)

$$\Delta T(k) = \frac{V_{ref} - \left\{\frac{L}{3T_s} - \frac{T_s}{2C}\right\} i_C(k)}{V_{in}(k)} T_s \quad (14)$$

The pulse width ΔT(k) expressed by Formula 13 uses the detected capacitance current iC(k) and the detected output voltage vo(k) to conduct the control in such a way that the detected output voltage vo(k) becomes the command voltage Vref.

The pulse width ΔT(k) expressed by Formula 14 uses the detected capacitance current iC(k) to conduct the control in such a way that the detected output voltage vo(k) becomes the command voltage Vref. In Formula 14, the coefficient Av is set to Av=3 Ts/L to eliminate the need for detecting the detected output voltage vo(k), and thus only the capacitance current iC(k) is detected to determine the pulse width ΔT(k).

In the constant-current control, the pulse width ΔT(k) expressed by the following Formula 15 is used to keep the detected current iC as the command current IC-ref so as to shift from the command voltage VL on the low power side toward the command voltage VH on the high power side or from the command voltage VH on the high power side toward the command voltage VL on the low power side.

(Formula 17)

$$\Delta T(k) = \frac{\frac{L}{3} I_{C-ref} - \left\{\frac{L}{3} - \frac{T_s^2}{2C}\right\} i_C(k) + T_s v_o(k)}{V_{in}(k)} \quad (15)$$

As to the command current IC-ref of the capacitance current in the High/Low two-level control, the command current of IC-refH that corresponds to VH of the High level and the command current of IC-refL that corresponds to VL of the Low level are taken as examples.

In the High/Low two-level control, the constant-voltage control in the power retention period and the constant-current control in the power transition period are repeated.

(Mode Controls in Discrete Control)

In the discrete control, when the control form by the combination of the aforementioned constant-voltage control and the constant-current control is adopted, it is necessary to take into consideration the delay time as well as the overshoot and undershoot occurring during switching from the constant-current control to the constant-voltage control. Now, a description will be made about mode controls in the discrete control considering the delay time and the overshoot and undershoot.

The High/Low pulse operation performs the discrete control by a plurality of modes with the combinations of the constant-current control and the constant-voltage control, in order to take place of the smooth transition between the high power side and the low power side. In the switching operation during control switching from the constant-current control to the constant-voltage control in the control with the combination of the above-described constant-voltage control and the constant-current control, the discrete control according to the present invention utilizes three modes for controlling as described below so as to conduct the switching operation smoothly by suppressing the overshoot and undershoot.

Figure 14:
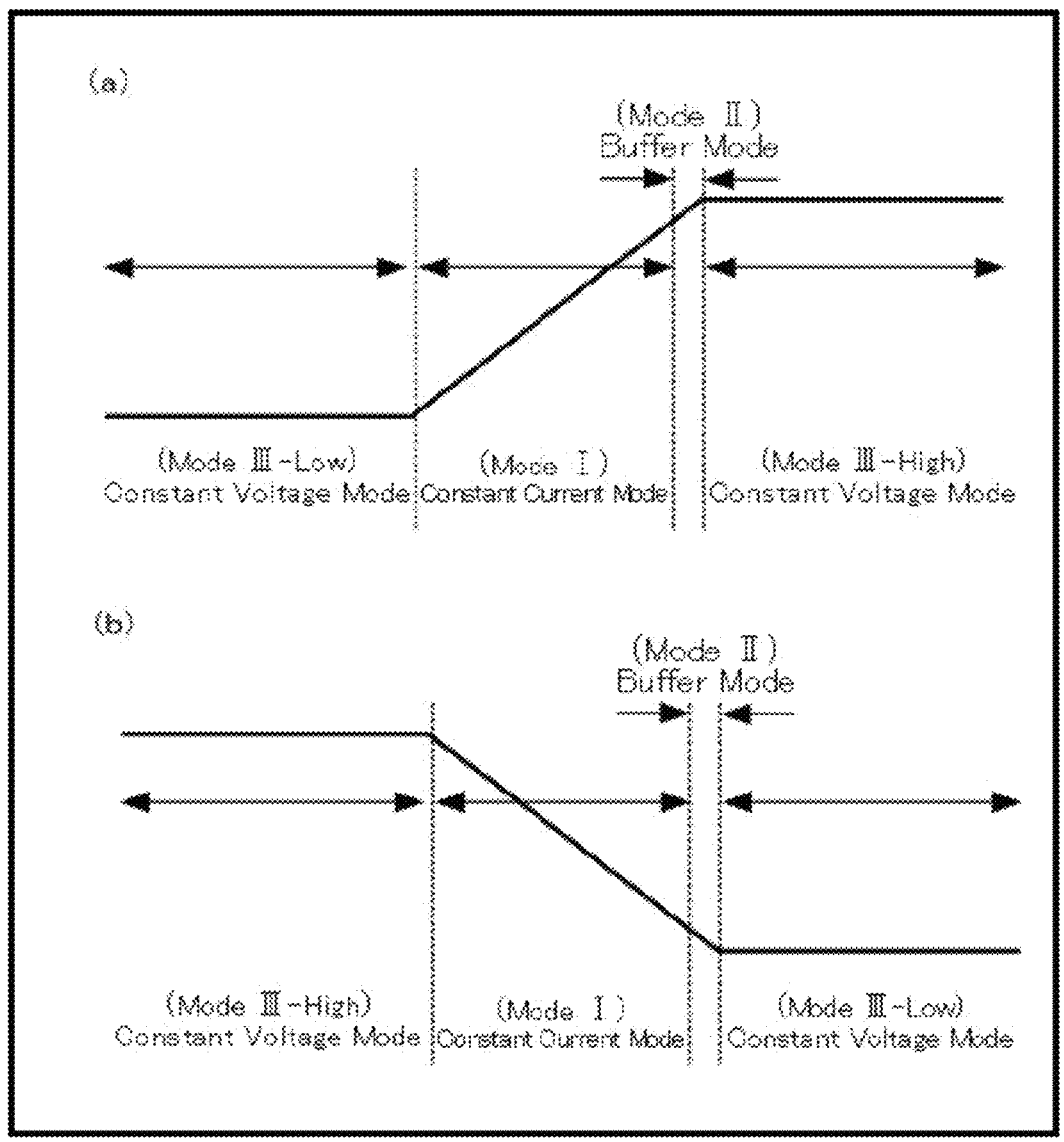
FIG. 14 is a diagram illustrating each mode in a High/Low pulse operation of discrete control according to the present invention.

In the High/Low pulse operation, the discrete control of the present invention consists of, as shown in FIG. 14, a first mode (mode I) for the constant-current control to be applied in the voltage transition between the high power side and the low power side, a third mode (mode III) for the constant-voltage control to be applied during the operation with the high power or low power, as well as a second mode (mode II) for the control in a buffer period for smoothly switching from the constant-current control to the constant-voltage control. In the following description, the first mode, second mode and third mode are represented as the mode I, mode II and mode III, respectively.

FIG. 14 shows a state of power transition by three modes of the mode I to mode III in the discrete control of the present invention, in which the respective modes in the High/Low pulse operation are illustrated. FIG. 14(*a*) shows the power transition from the low power side to the high power side, and FIG. 14(*b*) shows the power transition from the high power side to the low power side.

When performing the transition of the power from the low power side to the high power side, the constant-voltage control in the mode III is carried out during the low power operation, and the constant-current control in the mode I is carried out during the voltage transition from the low power side to the high power side, and the constant-voltage control of the buffer mode in the mode II is carried out between the switching from the constant-current control in the mode I to the constant-voltage control in the mode III.

On the other hand, when performing the transition of the power from the high power side to the low power side, the constant-voltage control in the mode III is carried out during the high power operation, and the constant-current control in the mode I is carried out during the voltage transition from the high power side to the low power side, and the constant-voltage control of the buffer mode in the mode II is carried out between the shift from the constant-current control in the mode I to the constant-voltage control in the mode III.

Next, the mode I, mode II and mode III will be described.

<Mode I: Constant-Current Control>

The mode I is the constant-current discrete control to be conducted during the voltage transition between the high power side and the low power side, which control is applied to the transition from low power side to the high power side and the transition from the high power side to the low power side. The constant-current discrete control is implemented to prevent the occurrence of overshoot and undershoot and the occurrence of overcurrent during the transition.

When the inductance current iL(ks) is detected by the DC current sensor, the delay time of several μs occurs. By contrast, concerning the AC current sensor, many general-purpose devices have less delay time. Thus, in order to use the capacitance current that can be detected by the AC current sensor for control, the command value iL(k+1) related to the inductance current iL is defined by the following Formula 16. In the following description, the command value of the voltage is presented as Vref, and the command value of the capacitance current is presented as IC-ref or ICref.

(Formula 18)

$$i_L(k+1) = I_{Cref} + i_R(k_s) \quad (16)$$

Furthermore, the relation between an average current $i_{L-ave}(k_s)$ of the inductance, an average current $i_{C-ave}(k_s)$ of the capacitance current iC and the load current $i_R(k_s)$ is expressed by the following Formula 17.

(Formula 19)

$$i_{L-ave}(k_s) = i_{C-ave}(k_s) + i_R(k_s) \quad (17)$$

By substituting Formula 16 and Formula 17 into Formula 13, the expression of the discrete control using the detected capacitance current iC can be obtained.

(Formula 20)

$$\Delta T(k) = \frac{\frac{L}{3}I_{Cref} - \left\{\frac{L}{3} - \frac{(T_s+T_d)^2}{2C}\right\}i_{C-ave}(k_s)}{V_{in}} + \frac{(T_s+T_d)v_o(k_s)}{V_{in}} - \frac{T_d}{T_s}\Delta T(k-1) \quad (18)$$

The pulse widths $\Delta T(k)$ in the single-phase and n-phase controls are expressed by the following formulas.

(Formula 21)

$$\Delta T(k) = \frac{LI_{Cref} - \left\{L - \frac{(T_s+T_d)^2}{2C}\right\}i_{C-ave}(k_s)}{V_{in}} + \frac{(T_s+T_d)v_o(k_s)}{V_{in}} - \frac{T_d}{T_s}\Delta T(k-1) \quad (19)$$

(Formula 22)

$$\Delta T(k) = \frac{\frac{L}{n}I_{Cref} - \left\{\frac{L}{n} - \frac{(T_s+T_d)^2}{2C}\right\}i_{C-ave}(k_s)}{V_{in}} + \frac{(T_s+T_d)v_o(k_s)}{V_{in}} - \frac{T_d}{T_s}\Delta T(k-1) \quad (20)$$

The pulse widths $\Delta T(k)$ obtained by Formula 19 and Formula 20 include as the detection values the capacitance average current $i_{C-ave}(k_s)$ and the detected output voltage $v_o(k_s)$.

The calculation of the capacitance average current $i_{C-ave}(k_s)$ is implemented in such a way that the average value is determined by detecting the capacitance current iC for every sampling cycle Tsample which is shorter than the control cycle Ts to thereby obtain the average current in the control cycle Ts.

Since the detected voltage $v_o(k_s)$ of the output is typically obtained via an insulated amplifier, the delay time of several µs occurs. Thus, the detected output voltage $v_o(k_s)$ is determined by using the capacitance current detected by the AC current sensor that is capable of high-speed detection.

The calculation of the detected output voltage $v_o(k_s)$ using the capacitance current iC is implemented in such a way that the detection and the computation are performed for every sampling cycle Tsample which is shorter than the sampling cycle Ts to obtain the average current in the sampling cycle Ts and the change in voltage using the average current.

Provided that the detection value of the output voltage obtained at the time immediately before the shift either from the low power side to the high power side or from the high power side to the low power side is defined to an initial value $v_o(k_s)$, an output voltage $v_{odet}(k_s+1)$ can be obtained by the computation in the control sample after the sampling cycle Ts.

The output voltage $v_{odet}(k_s+1)$ is represented by the sum of values obtained by multiplying each of a voltage $i_c/C$ in the sampling cycle Ts of the capacitance C and the output voltage $v_{odet}(k_s)$ at the point ks by a coefficient of $(k_s+(m-1)\cdot Tsample/Ts)$, and is calculated as below.

(Formula 23)

$$V_{odet}(k_s+1) = \frac{i_c\left(k_s+(m-1)\frac{T_{sample}}{T_s}\right)}{C}T_s + V_{odet}\left(k_s+(m-1)\frac{T_{sample}}{T_s}\right) \quad (21)$$

In this regard, Tsample is a time interval for detecting at high speed the capacitance current iC, and m is the number of times capable of high-speed detection in one control cycle. That is to say, Ts=m·Tsample.

The detected voltage vodet of the output obtained by the above high-speed computing is substituted into the term of vo in Formula 20. Consequently, provided that the command value is iCref, the pulse width $\Delta T(k)$ of the manipulated variable can be obtained by the following Formula 22 using the capacitance current iC alone.

Mode I (Pulse Width $\Delta T(k)$ in the Constant-Current Discrete Control)

(Formula 24)

$$\Delta T(k) = \frac{\frac{L}{3}I_{Cref} - \left\{\frac{L}{3} - \frac{(T_s+T_d)^2}{2C}\right\}i_{C-ave}(k_s)}{V_{in}} + \frac{(T_s+T_d)v_{odet}(k_s)}{V_{in}} - \frac{T_d}{T_s}\Delta T(k-1) \quad (22)$$

This pulse width $\Delta T(k)$ is the manipulated variable for the IC discrete control in the mode I.

<Mode II: Buffer Mode During Control Switching>

In contrast to the mode I which employs the constant-current discrete control, the mode II and the mode III employ the constant-voltage discrete control. The constant-voltage discrete control also uses the capacitance current iC as the detection value, as with the constant-current discrete control. In order to obtain a control expression using the capacitance current iC instead of the inductance current iL, the command value $i_L(k+1)$ is defined as below by using a gain A1.

(Formula 25)

$$i_L(k+1) = A_1\{V_{ref} - V_o(k_s)\} + i_R(k_s) \quad (23)$$

In addition to that, the above Formula 23 is used to modify Formula 11 for the pulse width $\Delta T(k)$, thereby obtaining the following Formula 24.

Mode II (Pulse Width ΔT(k) in the Constant-Voltage Discrete Control)

(Formula 26)

$$\Delta T(k) = \frac{\frac{L}{3}A_1\{V_{ref} - V_0(k_s)\} - \left\{\frac{L}{3} - \frac{(T_s + T_d)^2}{2C}\right\}i_{C-ave}(k_s)}{V_{in}} + \frac{(T_s + T_d)v_o(k_s)}{V_{in}} - \frac{T_d}{T_s}\Delta T(k-1) \quad (24)$$

The mode II is a buffer mode to shift from the constant-current control to the constant-voltage control as shown in FIG. 14. The buffer mode uses the gain A1 that is smaller than a gain A2 to be used in the constant-voltage control in the mode III to prevent the occurrence of the overshoot and undershoot. Since the output voltage is in transition in the mode II, the use of a low-speed detected voltage induces significantly affect by the delay time. Thus, as with the mode I, the output voltage vodet estimated from the capacitance current is used for the discrete control.

Accordingly, the manipulated variable in the iC discrete control using the capacitance current iC in the mode II is expressed by the following Formulas 25 and 26, in which the gain A1 of the pulse width ΔT(k) expressed by Formula 24 is replaced by gains AH1 and AL1. The gain AH1 is a gain on the high power side, and the gain AL1 is a gain on the low power side.

Mode II (Pulse Width ΔT(k) in the Constant-Voltage Discrete Control)

(Formula 27)

$$\Delta T(k) = \frac{\frac{L}{3}A_{H1}\{V_{ref} - V_{odet}(k_s)\} - \left\{\frac{L}{3} - \frac{(T_s + T_d)^2}{2C}\right\}i_{C-ave}(k_s)}{V_{in}} + \frac{(T_s + T_d)v_{odet}(k_s)}{V_{in}} - \frac{T_d}{T_s}\Delta T(k-1) \quad (25)$$

$$\Delta T(k) = \frac{\frac{L}{3}A_{L1}\{-V_{ref} + V_{odet}(k_s)\} - \left\{\frac{L}{3} - \frac{(T_s + T_d)^2}{2C}\right\}i_{C-ave}(k_s)}{V_{in}} + \frac{(T_s + T_d)v_{odet}(k_s)}{V_{in}} - \frac{T_d}{T_s}\Delta T(k-1) \quad (26)$$

<Mode III: Constant-Voltage Discrete Control>

In the mode III, the value iL(k+1) is defined as the command value by Formula 23, as with the mode II. In addition to that, in order to eliminate the affect by the low-speed detected voltage, another gain A2 is defined by the following Formula 27.

(Formula 28)

$$A_2 = \frac{3(T_s + T_d)}{L} \quad (27)$$

With the definition of the gain A2 by Formula 27, the expression of the discrete control in the mode III can be obtained by the following Formula 28.

Mode III (Pulse Width ΔT(k) in the Constant-Voltage Discrete Control)

(Formula 29)

$$\Delta T(k) = \frac{(T_s + T_d)V_{ref} - \left\{\frac{L}{3} - \frac{(T_s + T_d)^2}{2C}\right\}i_{C-ave}(k_s)}{V_{in}} - \frac{T_d}{T_s}\Delta T(k-1) \quad (28)$$

Consequently, the term of the low-speed detected voltage vo(ks) is deleted also in the constant-voltage discrete control, thereby obtaining the expression of the discrete control using only the capacitance current iC which can be detected by the high-speed detection as the detection value.

Figure 15:
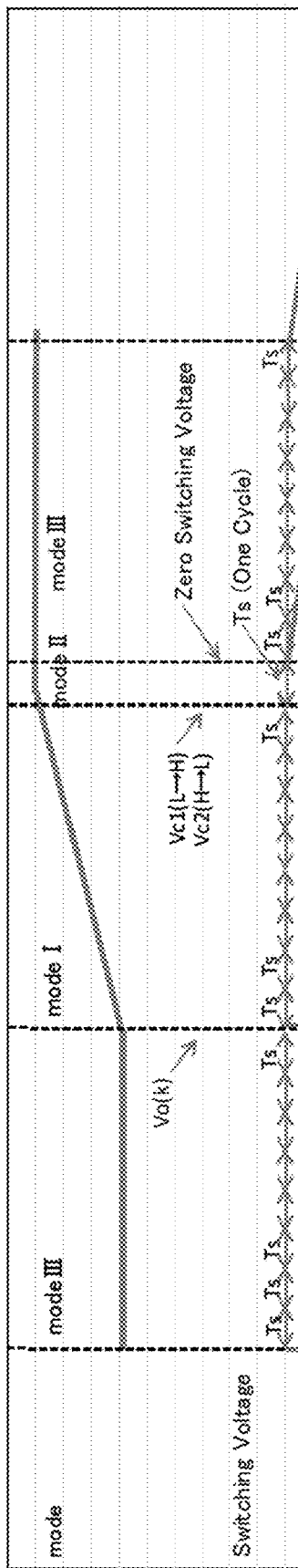
FIG. 15 is a diagram illustrating a controlling form of each mode in the discrete control and parameters according to the present invention.
Figure 16:
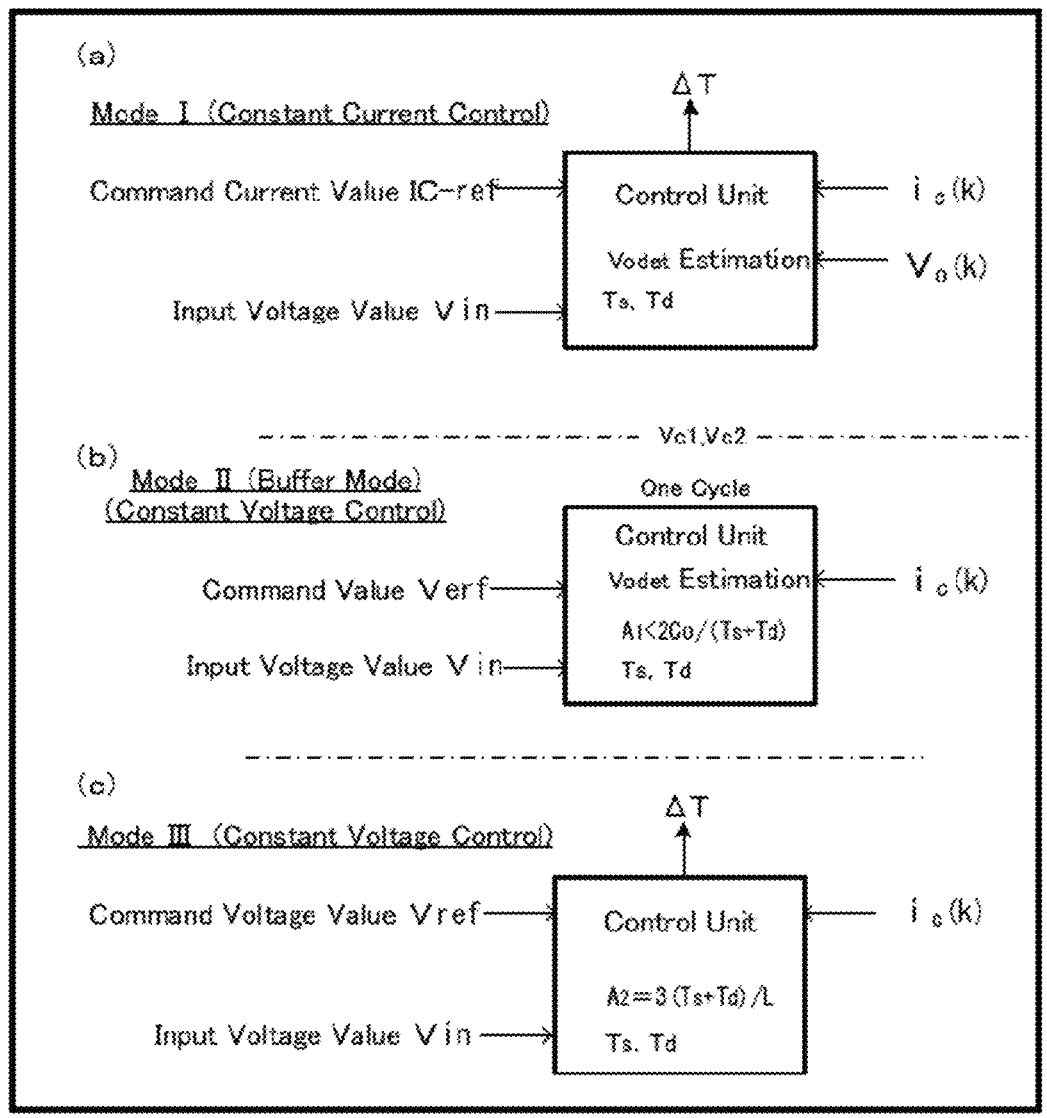
FIG. 16 is a diagram illustrating a controlling form of each mode in the discrete control based on three phases according to the present invention.

FIG. 15 shows the respective controlling forms, control periods, pulse widths ΔT(k), command values, output detected voltages, delay times Td, objects to be controlled, gains and others in the mode I, mode II and mode III, and FIG. 16 shows the respective control forms of the mode I, mode II and mode III.

In FIGS. 15 and 16(a), the mode I conducts the constant-current discrete control in the transition period for shifting between the low power side and the high power side, so as to implement the constant-current discrete control to allow the capacitance current iC of the object to be controlled to become the command value IC-ref. In the mode I, the detected voltage of the output is estimated from the capacitance current iC. Furthermore, the output voltage vodet(ks) for the discrete control at the point ks is estimated from the output detected voltage vo(ks−1) at the point ks or the output voltage vodet(ks−1) for the discrete control at the point (ks−1).

In FIGS. 15 and 16(b), the mode II conducts the constant-voltage discrete control in the buffer period between the transition period and the retention period, so as to implement the constant-voltage discrete control to allow the detected power voltage vo to be controlled to become the command value Vref. In the mode II, the detected voltage of the output is also estimated from the capacitance current iC. The switching from the mode I to the mode II is conducted after the detected output voltage vo reaches a switching voltage Vc1 or Vc2. The buffer period for the control switching by the mode II is one sampling cycle Ts of the control cycle of the control circuit (controller) that switches the control to the mode III after one sampling cycle Ts.

In FIGS. 15 and 16(c), the mode III conducts the constant-voltage discrete control in the retention period, so as to implement the constant-voltage discrete control to keep the detected output voltage vo to be controlled to the command value vref. In the mode III, the gain A2 in the pulse width ΔT(k) is set to 3(Ts+Td)/L to eliminate the term of the detected output voltage vo(ks), thereby negating the need for the detected voltage of the output. By negating the need for the detected voltage of the output, the speed of the control can be increased.

Next, a description will be made with reference to FIG. 17 about a signal state in the discrete control by the mode I, mode II and mode III in the switching operation of the voltage level of the DC/DC converter of the present invention.

In the following description on the discrete control by each mode, described is an example of the High/Low two-level control for switching the power level between the high voltage level (high power side) and the low voltage level (low power side). The High/Low two-level control is one example, and thus similar discrete control can be employed between a plurality of power levels in which the power levels differ from one another.

In the discrete control by the mode I, mode II and mode III, the switching from the low power side to the high power side and the switching from the high power side to the low power side are carried out by combining the constant-voltage control and the constant-current control.

Figure 17:
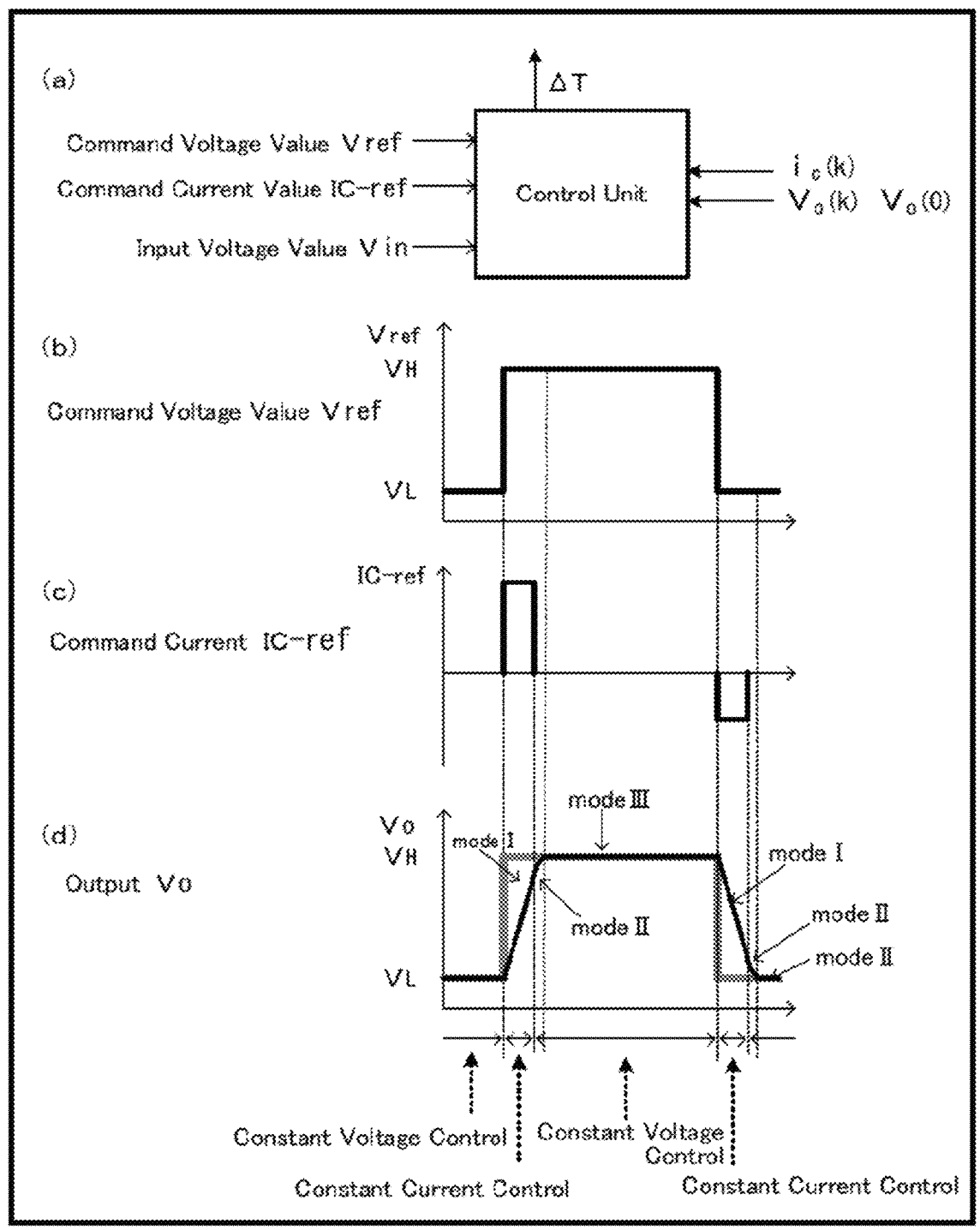
FIG. 17 is a diagram illustrating signal states in the discrete control by the mode I, mode II and mode III according to the present invention.

FIG. 17 illustrates the control form of the discrete control by the mode I, mode II and mode III, in which FIG. 17(a) schematically shows the control unit, FIGS. 17(b) and 17(c) respectively show the command voltage Vref and the command current IC-ref, respectively, and FIG. 17(d) shows the detected output voltage vo. In this figure, the capacitance current iC is used as the detected current.

<Mode I>

The transition from the low power side to the high power side and the transition from the high power side to the low poser side are performed by the constant-current discrete control by the mode I. In the mode I, by using the pulse width ΔT(k) obtained by Formula 20 or 22 to retain the detected current iC to the command current IC-ref, the transition is conducted from the command voltage VL on the low power side toward the command voltage VH on the high power side or from the command voltage VH on the high power side toward the command voltage VL on the low power side.

<Mode II>

At the time that the detected output voltage vo reach the switching voltage Vc1 or Vc2, the constant-voltage discrete control is performed to switch from the constant-current control by the mode I to the constant-voltage control by the mode III. The control period by the mode II is the buffer period for smoothly switching from the constant-current control to the constant-voltage control. The time width in the buffer period can be an integral multiple of the sampling cycle Ts in the control cycle of the control circuit (controller). The time width in the buffer period is defined to be one sampling cycle Ts to shift from the mode I to the mode III in one sampling cycle Ts, thereby increasing the control speed. The time width of the buffer period can be not only one sampling cycle Ts but also n-sampling cycle (n·Ts). In this context, n is an integer.

The mode II uses the pulse width ΔT(k) obtained by Formula 25 to shift from the command voltage VL on the low power side to the command voltage VH on the high power side or from the command voltage VH on the high power side to the command voltage VL on the low power side. The mode II is implemented to prevent the overshoot and understood due to the constant-voltage control. After the constant-voltage discrete control by the mode II is performed for only one sampling cycle Ts, the control is switched to the constant-voltage discrete control by the mode III.

<Mode III>

The constant-voltage control by the mode III is conducted after the mode II to control the detected output voltage vo to be the command voltage value Vref. In FIG. 17, the command voltage Vref on the low power side is defined as VL, and the command voltage Vref on the high power side is defined as VH.

By implementing the mode I, mode II and mode III, one pulse having two levels of high and low is formed, and the repetition of these three modes forms a plurality of pulse outputs. FIGS. 17(b) to 17(d) schematically show the voltage waveforms for purposes of illustration, but not show the actual voltage waveforms.

<Switching of Modes>

Figure 18:
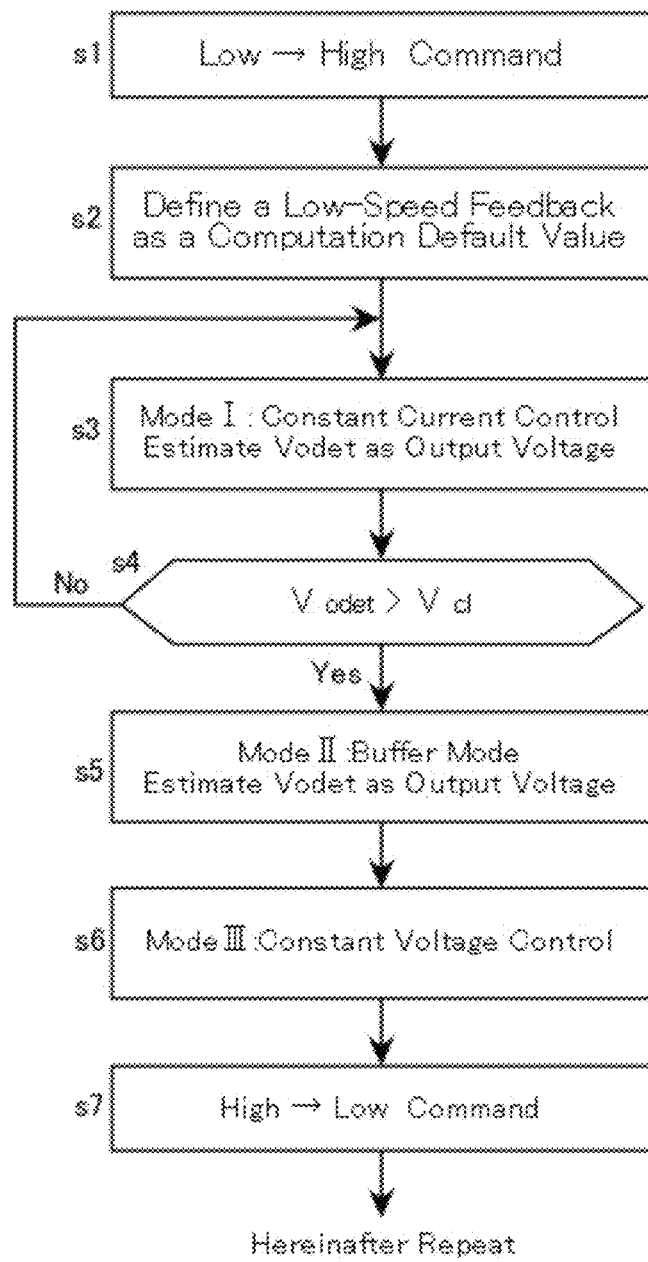
FIG. 18 is a flowchart illustrating a mode transition when shifting from a low power side to a high power side.

In the above-described modes, the transition is repeated in the order of the mode I, mode II and mode III. FIG. 18 is a flowchart showing an example of a mode transition during shifting from the low power side to the high power side. Although this example shows that the mode II is carried out in a cycle of the one sampling cycle, the mode II may be carried out in several cycles. Moreover, these cycles are not limited to the sampling cycle, and may be an arbitrary cycle.

In response to a command for shifting from the low power side to the high power side (s1), the detected output voltage vo(k) obtained by the computation at the control sampling time after the command is calculated as vodet(ks), and the voltage detection value at the point of sampling is defined as a computation default value vodet(0) for computing the output voltage vodet(k), In response to a command for shifting from the high power side to the low power side (s1), the detection value vo(k) of the output voltage obtained at the point right before the shifting is defined as a default value vo(ks) (s2), and the computation is conducted in the mode I at the control sampling time after the control cycle Ts by using Formula 19 to estimate a value vodet(ks+1) as the output voltage (s3). As to the value vodet after the point (ks+1), the values vodet (ks+1), vodet(ks+2) and voldet (ks+3) can also be estimated in a similar way.

When the estimated value vodet of the output voltage estimated in the mode I exceeds the switching voltage Vc1, the mode shifts to the mode II of buffer mode (s4). The mode II conducts the computation to estimate the estimated value vodet of the output voltage. After the mode II is activated, then the mode shifts to the mode III. The mode II is implemented only in one sampling cycle in here, but may be implemented in several sampling cycles. In addition to that, the cycle is not restricted to the sampling cycle, and thus an arbitrarily defined cycle may be applied (s5). The mode III performs the constant-voltage control. This constant-voltage control detects the low-speed voltage detection value to thereby control the detection value to be the command voltage value. The constant-voltage control in the mode III is the constant-voltage control to be performed on the high power side because it is based on the shift command to the high power side. In the constant-voltage control in the mode III, the gain value can be set according to a circuit constant so as to negate the need for the voltage detection value. By negating the need for the voltage detection value, the influence by the delay due to the low-speed voltage detection can be eliminated (s6).

The shift command is switched from the high power side to the low power side (s7), and then the shift is carried out in similar way to the above-described steps s2 to s6. This shift is from the high power side to the low power side.

<Switching Voltage Vc1, Vc2>

The switching voltages Vc1 and Vc2 from the mode I to the mode II are calculated by the following Formulas 29 and 30, respectively.

(Formula 30)

$$V_{c1} = V_{Href} - \frac{3T_s + 2T_d}{2C_o} I_{cref} \quad (29)$$

(Formula 31)

$$V_{c2} = V_{Lref} + \frac{3T_s + 2T_d}{2C_o} I_{cref} \quad (30)$$

The voltage Vc1 is the switching voltage used for switching from the low power side to the high power side, and the voltage Vc2 is the switching voltage used for switching from the high power side to the low power side.

The switching voltages Vc1, Vc2 are defined by taking into consideration the maximum change of voltage at an interval to switch to the mode III, and is a value of generation limit voltage in which the change in the voltage at the starting time of the mode III leads to the overshoot or undershoot. For example, the change in the voltage at the maximum time Ts caused by jitter of the switching voltage, the change in the voltage occurring in one sample after altering the command value, and the change in the voltage during the control delay time Td are taken into account to select the voltage that does not cause the overshoot.

The switching voltages Vc1, Vc2 are for implementing the mode switching by subtracting from the voltage command value the maximum change in the voltage during the time until switching to the mode III to thereby preventing the overshoot in all conditions.

That is to say, the change in the voltage at a maximum time $T_s$ caused by the jitter of the switching voltage ((Ts/Co)·ICref), the change in the voltage occurring in one sample after the command value is changed ((Ts/2Co)·ICref), and the change in the voltage during the control delay time Td ((Td/Co)·ICref) are subtracted from the voltage command value VHref to obtain Formulas 29 and 30. In this context, Co is the output capacity of the main circuit.

The switching voltages Vc1, Vc2 respectively expressed by Formulas 29, 30 are examples of the three-phase interleaving that takes into consideration the maximum change in the voltage, and thus if the number of phase is n, the coefficient of Ts in the formula can be replaced by n from three, or if the maximum change in the voltage is acceptable, the switching voltages Vc1, Vc2 can be multiplied by a coefficient having a predetermined value smaller than 1.

<Gain A1 (AH1, AL1)>

The manipulated variables for the discrete control in the mode II are expressed by Formulas (25) and (26), respectively, and a gain A1 (AH1, AL1) included in each formula prevents the overshoot and undershoot. Now, the range of the gain A1 (AH1, AL1) in the mode II will be described. In this regard, the description refers to the transition from the low power side to the high power side.

If the voltage command value in the high power is defined as VHref, the voltage detection value computed based on the capacitance current iC in the mode II is defined as Vodet−mode2 and the detected current value in the mode III is defined as Vo−mode3, the capacitance current command value in each mode is represented as below.

Mode I: ICref

Mode II: AH1(VHref−Vodet−mode2)

Mode III: A2(VHref−Vo−mode3)≈0, wherein A2=3(Ts+Td)/L

Since the mode II is the buffer period between the mode I and the mode III, the capacitance current command in the mode II is in the range between the mode I and the mode III, and thus has the relationship of ICref>AH1(VHref−Vodet−mode2)>0.

By using the above magnitude relationship and an evaluation voltage VC1 for switching expressed by Formula 29, the range of the gain AH1 is expressed by the following formula.

(Formula 32)

$$0 < A_{H1} < \frac{2C_o}{T_s + 2T_d} \quad (31)$$

Thus, the gain AH1 is used as a coefficient for determining following characteristic for the command voltage VHref on the high side in the aforementioned range. The gain AL1 will not be described in here, but can be processed in the same way as the gain AH1.

<Gain A2>

In Formula 24 expressing the pulse width T(k) of the constant-voltage discrete control, the term of the detected voltage is {(L/3)·A1·vo(ks)/Vin} and {(Td+Ts)·vo(ks)/Vin}. By applying Formula 24 to the mode III to replace the gain A1 by the gain A2 and defining the gain A2 by Formula 27, the terms of two detected voltages are balanced out each other, thereby removing the term of vo(k) of the output voltage. Consequently, the expression of the discrete control in the mode III is expressed by Formula 28 that does not include the detected output voltage vo(k).

Concerning the pulse widths ΔT(k) in each of the modes I, II and III, each formula (shown as "High") for the transition from the low power side to the high power side and each formula (shown as "Low") for the transition from the high power side to the low power side are collectively presented in the following formula.

(Formula 33)

High $$\begin{cases} \text{mode 1} \\ \text{If } v_o\det(k_s)(\text{Formula}(21)) \le v_{c1}(\text{Formula}(29))\text{Then} \\ \Delta T(k) = \dfrac{\dfrac{L}{3}I_{Cref} - \left\{\dfrac{L}{3} - \dfrac{(T_s+T_d)^2}{2C}\right\}i_{C-ave}(k_s)}{V_{in}} + \\ \qquad\qquad \dfrac{(T_s+T_d)v_{odet}(k_s)}{V_{in}} - \dfrac{T_d}{T_s}\Delta T(k-1) \\ \text{mode 2} \\ \text{If } v_o\det(ks) > v_{c1} \text{ then the operation period is 1 } cicle\ T \text{ at } AH_1 \\ \Delta T(k) = \dfrac{\dfrac{L}{3}A_{H1}(V_{Href} - V_{odet}(k_s)) - \left\{\dfrac{L}{3} - \dfrac{(T_s+T_d)^2}{2C}\right\}i_{C-ave}(k_s)}{V_{in}} + \\ \qquad\qquad \dfrac{(T_s+T_d)v_{odet}(k_s)}{V_{in}} - \dfrac{T_d}{T_s}\Delta T(k-1) \\ \text{mode 3} \\ \text{The next operation is } AH_2(A_v = 3T_s/L) \\ \Delta T(k) = \dfrac{(T_s+T_d)V_{ref} - \left\{\dfrac{L}{3} - \dfrac{(T_s+T_d)^2}{2C}\right\}i_{C-ave}(k_s)}{V_{in}} - \dfrac{T_d}{T_s}\Delta T(k-1) \end{cases}$$

Low $$\begin{cases} \text{mode 1} \\ \text{If } v_o\det(k_s)(\text{Formula}(21)) \ge v_{c2}(\text{Formula}(30))\text{Then} \\ \Delta T(k) = \dfrac{-\dfrac{L}{3}I_{Cref} - \left(\dfrac{L}{3} - \dfrac{(T_s+T_d)^2}{2C}\right)i_{C-ave}(k_s)}{V_{in}} + \\ \qquad\qquad \dfrac{(T_s+T_d)v_{odet}(k_s)}{V_{in}} - \dfrac{T_d}{T_s}\Delta T(k-1) \\ \text{mode 2} \\ \text{If } v_o\det(ks) > v_{c2} \text{ then the operation period is 1 } cicle\ T \text{ at } AH_1 \\ \Delta T(k) = \dfrac{\dfrac{L}{3}A_{H1}(V_{Lref} - V_{odet}(k_s)) - \left\{\dfrac{L}{3} - \dfrac{(T_s+T_d)^2}{2C}\right\}i_{C-ave}(k_s)}{V_{in}} + \\ \qquad\qquad \dfrac{(T_s+T_d)v_{odet}(k_s)}{V_{in}} - \dfrac{T_d}{T_s}\Delta T(k-1) \\ \text{mode 3} \\ \text{The next operation is } AH_2(A_v = 3T_s/L) \\ \Delta T(k) = \dfrac{(T_s+T_d)V_{ref} - \left\{\dfrac{L}{3} - \dfrac{(T_s+T_d)^2}{2C}\right\}i_{C-ave}(k_s)}{V_{in}} - \dfrac{T_d}{T_s}\Delta T(k-1) \end{cases}$$

Furthermore, there is a delay about 1 μs even in a conventional high-speed DC current sensor for detecting an inductance current. By contrast, there are many AC current sensors with response capability of 10 MHz or more (0.1 μs or less delay). Thus, the capacitance current which can be detected by the AC current sensor is used for performing the IC discrete control with the capacitance current iC to attain the high-speed control. It is to be noted that the above numerical value of the response capability of the sensor is an example which is not limited thereto, and the AC current sensor typically have the higher response capability than that of the DC current sensors.

In a verification by employing a circuit simulation and using actual equipment, the behavior of the High/Low pulse operation by the DC/DC converter of the present invention was measured, and thereby the effectiveness of the discrete control considering the control delay has been confirmed.

(Examples of Application to DC Power Supply Device and AC Power Supply Device)

Next, a description will be made on the examples of application of the DC/DC converter of the present invention to a DC power supply device and an AC power supply device, by referring to FIG. 19.

Figure 19:
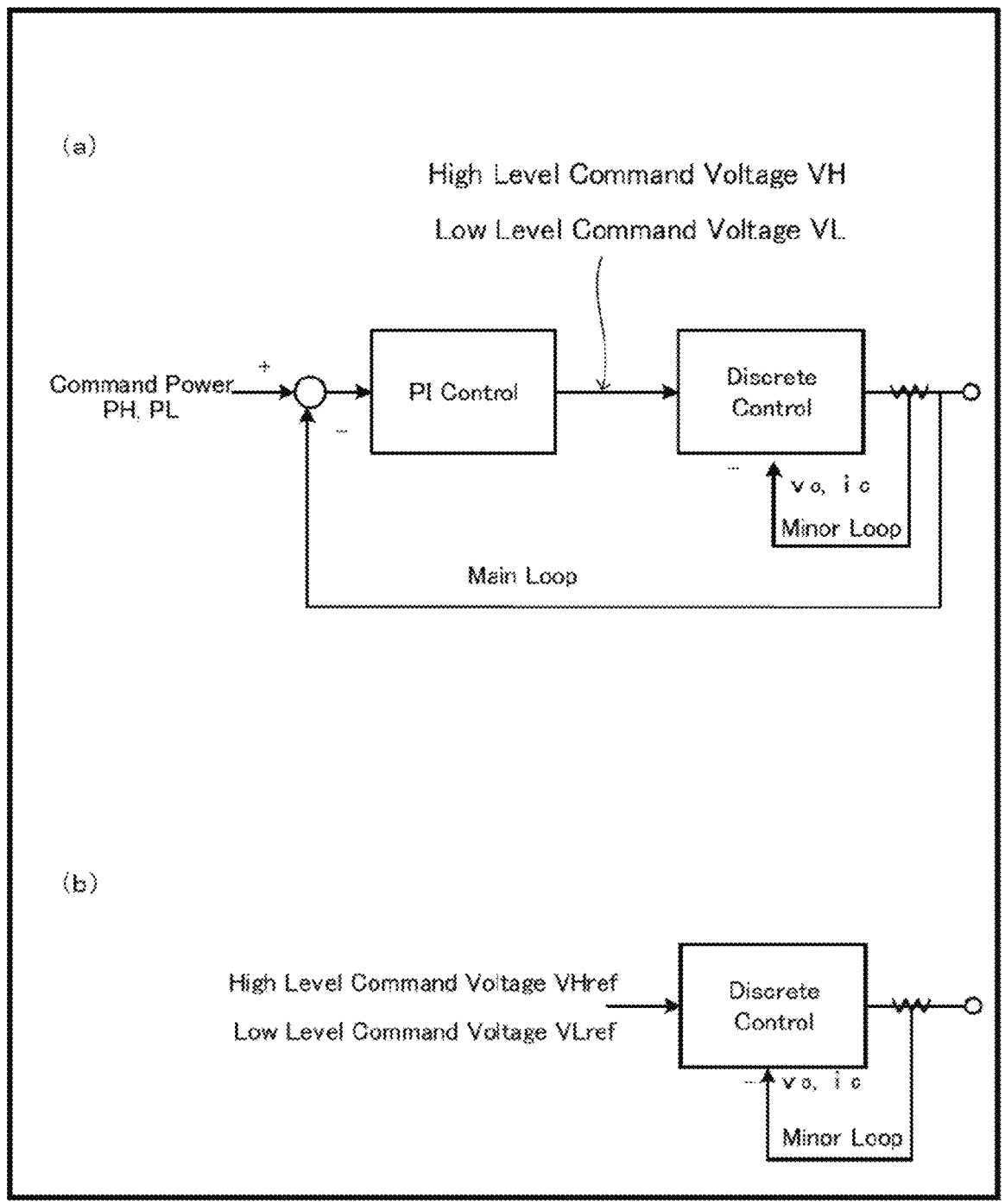
FIG. 19 is a diagram illustrating examples of the application of the DC/DC converter according to the present invention to a DC power source device and an AC power source device.

FIG. 19 is a diagram of control block illustrating the control system in the examples of application of the DC/DC converter of the present invention to the DC power supply device and the AC power supply device.

The control system of the control blocks shown in FIG. 19($a$) is an example of the configuration including PI control constituting a main loop control system and discrete control constituting a minor loop control system, and the control system of the control block shown in FIG. 19($b$) is an example of the configuration including only the discrete control constituting the minor loop control system.

The configuration shown in FIG. 19($a$) forms the command voltages VH, VL by the PI control on the basis of the command powers PH, PL in the main loop control system, so as to conduct the discrete control in the minor loop control system.

In addition to that, the configuration shown in FIG. 19($b$) conducts the discrete control in the minor loop control system based on the given command voltages VH, VL. If the command voltages VH, VL are obtained, the discrete control can be implemented without the need for the main loop control system.

With respect to the discrete control constituting the minor loop control system, the present invention applies the two-level discrete control system that performs the control according to DC command voltages of the high level command voltage VH and the low level command voltage VL in the bilateral step-down chopper circuit with the multi-phase interleaving system of the DC/DC converter of the present invention.

When the two-level control in the high level and the low level is performed, the high level power command PH and the low level power command PL are used as command signals in the main loop to conduct the PI control by detecting the power obtained from the load side, thereby obtaining the high level command voltage VH and the low level command voltage VL.

In the minor loop, the high level command voltage VH and the low level command voltage VL obtained by the PI control are used as the command values, so that the detected output voltage vo or the capacitance current iC are detected to implement the discrete control.

As the descriptions about the embodiments and their variations are presented as examples of the DC/DC converter in accordance with the present invention and are not limited thereto, the variation can be implemented in many ways based on the purpose of the present invention, and thus these variations are not excluded from the scope of the present invention.

INDUSTRIAL APPLICABILITY

The DC/DC converter of the present invention is applicable to equipment for manufacturing semiconductors, liquid crystal display panels and others, vacuum deposition equipment, and applicable for supplying high-frequency power to an apparatus that uses a high-frequency wave, such as heating and fusion apparatus.

REFERENCE SIGNS LIST

1 DC/DC Converter
2 Main Circuit (Chopper Circuit)
3 Switching Circuit
4 LC Circuit
5 Switching Signal Generator
6 Control Unit
7 Load

The invention claimed is:

1. A DC/DC converter comprising a main circuit including a switching circuit and a control unit to convert a DC input into high-frequency outputs at a plurality of different voltage levels, wherein
the control unit includes the following modes to be performed between each of a power level before transition and a power level after transition:
a first mode that conducts constant-current control between voltage levels to implement a transition period between a power level before transition and a power level after transition;
a third mode that conducts constant-voltage control to implement a retention period for retaining voltages of the power level before transition and the power level after transition; and
a second mode that conducts the constant-voltage control to implement a buffer period to shift from the transition period to the retention period, in which
an output voltage to be fed back in the first mode and the second mode is an estimated output voltage based on a capacitance current,
a first gain of the main circuit in the second mode is a value that makes a second capacitance current command value smaller than a first capacitance current command value,
a second gain of the main circuit in the third mode is a value that cancels out a voltage detection value in the third mode, and thereby
the control unit repeats the three modes in sequence to output the high-frequency outputs at the plurality of voltage levels.

2. The DC/DC converter according to claim 1, wherein, the capacitance current command value in the second mode is a difference between a voltage command value and a detected voltage value in the second mode and an integrated value of the first gain, respectively.

3. The DC/DC converter according to claim 2, wherein in the second mode, the estimated output voltage is replaced by the detected output voltage as an output voltage to be fed back.

4. The DC/DC converter according to claim 1 wherein the main circuit comprises an n-phase LC circuit composed of a series-parallel circuit formed by an inductance and a capacitance in each phase which are connected in series-parallel,
when discrete control by n-phase interleaving is carried out on the control unit on condition that:

Ts is a control cycle of the control unit;
Td is a delay time from the control unit to the main circuit; and
L is an inductance component of the main circuit,
the second gain is a value that adjusts a coefficient of a detected output voltage of the LC circuit to be zero so as to delete a term of the detected output voltage.

5. The DC/DC converter according to claim 4, wherein the second gain is n-times larger than a ratio ((Ts+Td)/L) between a sum (Ts+Td) of the control cycle Ts and the delay time Td and the inductance component L of the main circuit.

6. The DC/DC converter according to claim 5, wherein in the second mode, the estimated output voltage is replaced by the detected output voltage as an output voltage to be fed back.

7. The DC/DC converter according to claim 4, wherein in the second mode, the estimated output voltage is replaced by the detected output voltage as an output voltage to be fed back.

8. The DC/DC converter according to claim 1, wherein in the second mode, the estimated output voltage is replaced by the detected output voltage as an output voltage to be fed back.

9. A control method for a DC/DC converter in which the DC/DC converter comprising a main circuit including a switching circuit and a control unit to convert a DC input into high-frequency outputs at a plurality of different voltage levels, wherein the control unit includes the following modes between each of a power level before transition and a power level after transition:
a first mode that conducts constant-current control to implement a transition period between a power level before transition and a power level after transition;
a third mode that conducts constant-voltage control to implement a retention period for retaining the power level before transition and the power level after transition; and
a second mode that conducts the constant-voltage control to implement a buffer period to shift from the transition period to the retention period, in which
an estimated output voltage based on a capacitance current is used as an output voltage to be fed back in the first mode and the second mode,
a value that makes a second capacitance current command value smaller than a first capacitance current command value is used as a first gain of the main circuit in the second mode,
a value that cancels out a voltage detection value in the third mode is used as a second gain of the main circuit in the third mode, and thereby
the control unit repeats the three modes in sequence to output the high-frequency outputs at the plurality of voltage levels.

10. The control method for the DC/DC converter according to claim 9, wherein in the second mode, the estimated output voltage is replaced by the detected output voltage as an output voltage to be fed back.

* * * * *